United States Patent
Musafia et al.

(10) Patent No.: US 12,074,298 B2
(45) Date of Patent: Aug. 27, 2024

(54) POWER PACK AND POWER PACK CIRCUITRY

(71) Applicant: EVCHIP ENERGY LTD., Nes-Ziona (IL)

(72) Inventors: Boaz Musafia, Hod-Hasharon (IL); Alon Medina, Shoham (IL)

(73) Assignee: EVChip Energy Ltd., Shoham (IL)

( * ) Notice: Subject to any disclaimer, the term of this patent is extended or adjusted under 35 U.S.C. 154(b) by 966 days.

(21) Appl. No.: 16/981,935

(22) PCT Filed: Mar. 17, 2019

(86) PCT No.: PCT/IL2019/050294
§ 371 (c)(1),
(2) Date: Sep. 17, 2020

(87) PCT Pub. No.: WO2019/180699
PCT Pub. Date: Sep. 26, 2019

(65) Prior Publication Data
US 2021/0020998 A1    Jan. 21, 2021

Related U.S. Application Data

(60) Provisional application No. 62/644,821, filed on Mar. 19, 2018.

(51) Int. Cl.
*H01M 10/42* (2006.01)
*H01M 10/44* (2006.01)
(Continued)

(52) U.S. Cl.
CPC ..... *H01M 10/4257* (2013.01); *H01M 10/441* (2013.01); *H01M 10/46* (2013.01);
(Continued)

(58) Field of Classification Search
CPC ........... H01M 10/4257; H01M 10/441; H01M 10/46; H01M 10/48; H01M 10/482;
(Continued)

(56) References Cited

U.S. PATENT DOCUMENTS 6,034,506 A * 3/2000 Hall .................. H02J 7/35
320/101
7,559,388 B2    7/2009 Severinsky et al.
(Continued)

FOREIGN PATENT DOCUMENTS

| CA | 2 463 135 A1 | 5/2003 |
| CN | 102263524 A | 11/2011 |

(Continued)

OTHER PUBLICATIONS

Official action issued on Mar. 31, 2016 in corresponding European Application No. 12 711 691.1, 5 pages.
(Continued)

*Primary Examiner* — Nha T Nguyen
(74) *Attorney, Agent, or Firm* — Rothwell, Figg, Ernst & Manbeck, P.C.

(57) ABSTRACT

A multi-level power cell pack switching circuitry having a plurality of first level cell circuits, and additional plurality of cell circuits of consecutively progressing levels, with switching and control configured to facilitate dynamically changing serial and/or parallel connections between cells and cell circuits.

15 Claims, 21 Drawing Sheets

(51) Int. Cl.
*H01M 10/46* (2006.01)
*H01M 10/48* (2006.01)
*H02J 7/00* (2006.01)

(52) U.S. Cl.
CPC ......... *H01M 10/48* (2013.01); *H01M 10/482* (2013.01); *H02J 7/0024* (2013.01)

(58) Field of Classification Search
CPC ............ H01M 10/0525; H01M 10/425; H02J 7/0024; Y02E 60/10; Y02P 70/50; Y02T 10/70
See application file for complete search history.

(56) References Cited

U.S. PATENT DOCUMENTS

| | | | |
|---|---|---|---|
| 7,705,560 | B2 | 4/2010 | Johnson |
| 9,172,254 | B2 | 10/2015 | Ganor |
| 9,484,753 | B2 | 11/2016 | Bui-Van et al. |
| 9,520,613 | B2 * | 12/2016 | Brockerhoff ........ H01M 10/441 |
| 9,564,767 | B2 * | 2/2017 | Takahashi .............. H01G 11/10 |
| 9,812,116 | B2 | 11/2017 | Ushakov |
| 10,193,359 | B2 * | 1/2019 | Ganor ............... H01M 10/4207 |
| 10,651,660 | B2 | 5/2020 | Ganor |
| 10,897,152 | B2 * | 1/2021 | Takahashi ........... H01M 4/5825 |
| 11,511,632 | B2 * | 11/2022 | Heydel ................. H02J 7/0019 |
| 2006/0092583 | A1 * | 5/2006 | Alahmad .............. H02J 7/0024 361/15 |
| 2008/0054327 | A1 | 3/2008 | Johnson |
| 2010/0261043 | A1 | 10/2010 | Kim et al. |
| 2010/0261048 | A1 * | 10/2010 | Kim ...................... H02J 7/0063 429/150 |
| 2012/0091964 | A1 * | 4/2012 | Vance ................... B60L 3/0046 320/122 |
| 2012/0133310 | A1 * | 5/2012 | Lee ....................... H02J 7/0024 320/117 |
| 2012/0187898 | A1 | 7/2012 | Nysen |
| 2012/0235483 | A1 | 9/2012 | Rigby et al. |
| 2012/0274140 | A1 * | 11/2012 | Ganor ............... H01M 10/0445 307/71 |
| 2014/0015488 | A1 | 1/2014 | Despesse |
| 2016/0059712 | A1 | 3/2016 | Jang |
| 2016/0381453 | A1 | 12/2016 | Ushakov |
| 2023/0268613 | A1 * | 8/2023 | Kullberg ............. H01M 50/383 429/163 |

FOREIGN PATENT DOCUMENTS

| | | |
|---|---|---|
| CN | 103534859 A | 1/2014 |
| DE | 10055531 A1 | 1/2002 |
| DE | 102007060329 A1 | 7/2009 |
| EP | 1 993 185 A2 | 11/2008 |
| FR | 2947112 A1 | 12/2010 |
| JP | H11234909 A | 8/1999 |
| JP | 2002291165 A | 10/2002 |
| JP | 2008148387 A | 6/2008 |
| JP | 2010172062 A | 8/2010 |
| JP | 2011050208 A | 3/2011 |
| WO | 2009158674 A2 | 12/2009 |
| WO | 2010002140 A2 | 1/2010 |
| WO | 2012123815 A1 | 9/2012 |

OTHER PUBLICATIONS

Second Official Action issued on Jan. 13, 2016 in corresponding Chinese Application No. 201280023490.6, 5 pages (English translation only).
Official action issued on Feb. 2, 2016 in corresponding Japanese Application No. 2013-558524, 2 pages (English translation only).
International Search Report and Written Opinion from corresponding Application No. PCT/IB2012/000529, issued on Aug. 10, 2012, 11 pages.
Office Action issued on May 5, 2015 in correspondng Chinese application No. 201280023490.6 (English translation only), 8 pages.
European Communication issued in application No. 12 711 691.1 dated Jul. 27, 2017, 5 pages.
Notice of Allowance and translation issued in corresponding Korean application No. 10-2013-7027460, dated Nov. 1, 2017, 4 pages.
Indian Office Action issued in corresponding Indian Application No. 7648/CHENP/2013, dated Sep. 10, 2018, 6 pages.
International Search Report and Written Opinion issued in International Application No. PCT/IL2019/050294 dated Jun. 23, 2019 (11 pages).
Yansong, L., et al., "Research on voltage balance system for super-capacitor stack," Electrical Measurement and Instrumentation, Vo. 53, No. 14, Jul. 25, 2016 (5 pages).
Translation of Chinese Office Action issued in corresponding Chinese Application No. 201980030560.2, dated May 16, 2024 (15 pages).

* cited by examiner

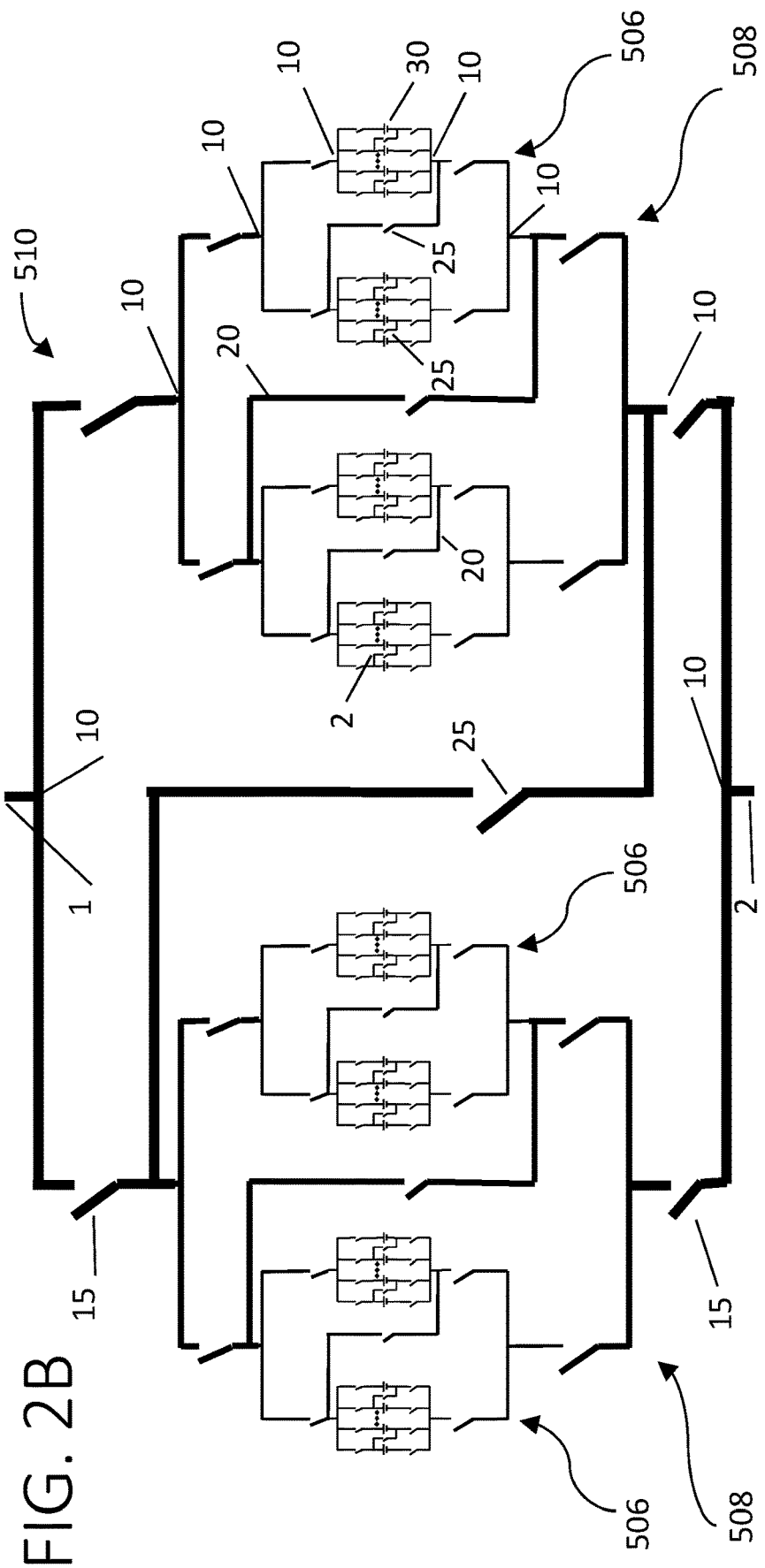

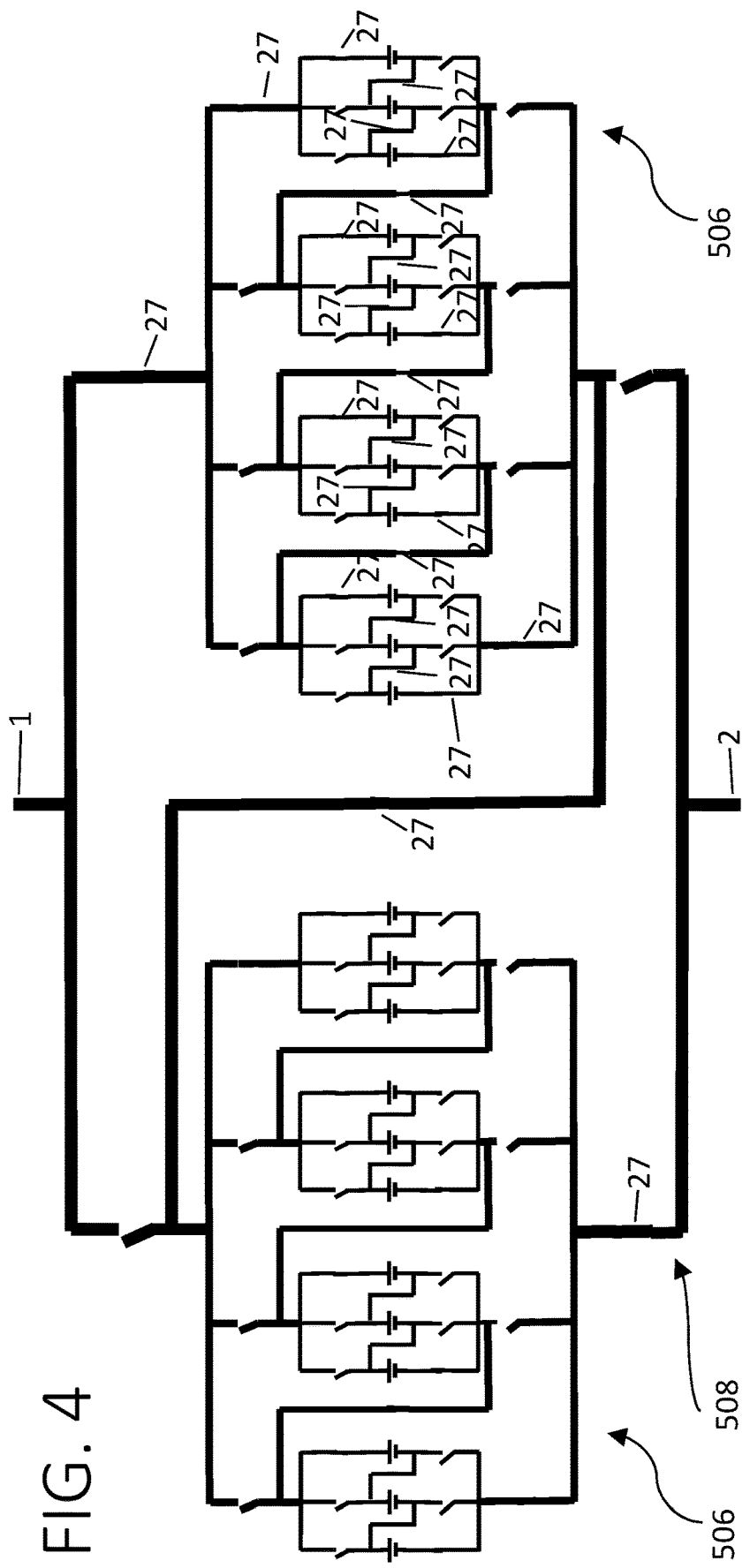

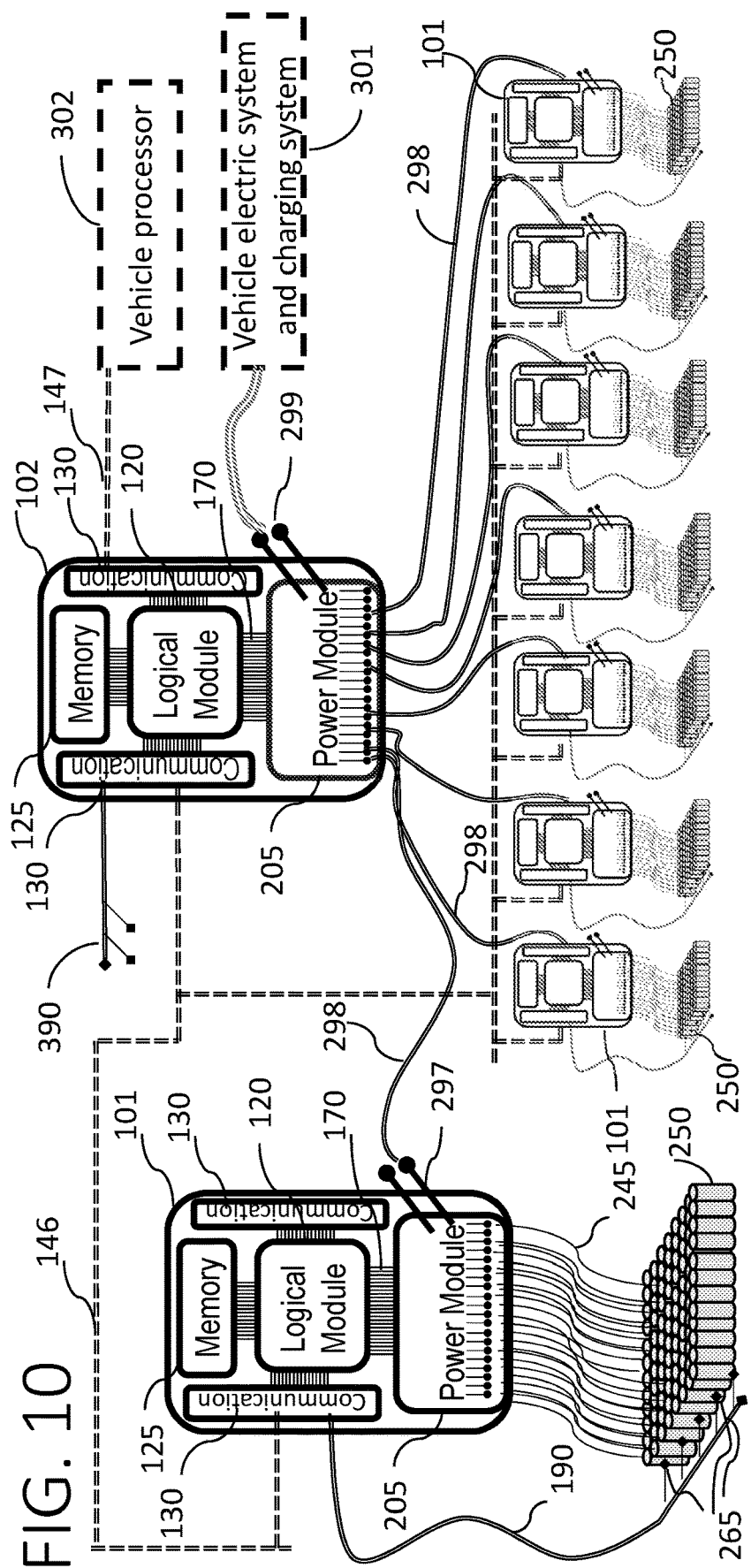

POWER PACK AND POWER PACK CIRCUITRY

CROSS REFERENCE TO RELATED APPLICATION(S)

This application is a 35 U.S.C. § 371 National Stage of International Patent Application No. PCT/IL2019/050294, filed Mar. 17, 2019, designating the United States and claiming priority to U.S. provisional application No. 62/644,821, filed on Mar. 19, 2018. The above identified applications are incorporated by reference.

FIELD OF THE INVENTION

The present invention relates to power pack systems, such as battery packs, electric vehicle battery packs, solar panels (e.g., photovoltaic cells) and the like.

BACKGROUND OF THE INVENTION

Battery packs are typically comprised of a set of similar (typically identical) batteries or cells that are configured in series, in parallel or in a mixture of both to deliver a desired voltage. Typically, when rechargeable battery packs age the performance of the whole pack becomes more heavily dependent on the weakest cells in the pack, relating to their state of health (SOH) and speed of charge/discharge. Cells with poor SOH typically degrade more rapidly than cells with good SOH. Thus, the overall performance and lifetime of a battery pack may be strongly influenced by the poor SOH cells, causing immature failures consequently requires battery pack replacement, in spite of the fact that the majority of the cells in the pack may still be in good SOH. This phenomenon may greatly affect the environment, by generating surplus of waste of dangerous materials and may cause a heavy economic burden, and increase, inter-alia, the cost of electrical devices and especially electric vehicles and their maintenance.

Currently the control of common battery packs is focused on safety issues, to avoid damaging the cells and avoiding fire. When certain cells in the pack reach the safety limits (or getting near to risking the health of the pack) the entire pack or module is disconnected.

Parameters like the ambient temperature, the state of charge of the cells, number of cycles, as well as the actual load current—affect the internal impedance of the cells and the degradation of electrochemical parameters of the cells. This process changes the specification of battery packs over time, and subsequently affects the electric vehicle battery packs life span.

The motor of electric vehicles is dependent on the power supplied from the battery pack, namely the current and voltage. The voltage affects the rotation speed of the motor while the current determines the Torque. The motor's needs are changing during the drive. When accelerating from standing position, the vehicle needs high Torque (current) and low voltage (speed); later when the vehicle gain speed it needs less current and more voltage; and in cruising speed low current and high voltage. (on the other hand, sporadic braking challenges the battery pack to absorb currents and voltage that are dependent to the speed and abruptness of the break). To support the range of voltage and current, dozens of cells are soldered as chains in series to achieve the range of hundreds of volts and then tens of chains are connected in parallel to support the current needed in the peak current usage during acceleration. In electric vehicles another element that provide this flexibility in output, is the inverter/converter that convert the high voltage to currant and backwards.

Since a common battery pack structure has a fixe structure that is predefined by the manufacturer, any damaged or weak cells may affect the performance of the entire pack. For this reason, the manufacturers add redundant cells to reduce the probability that few malfunctioning cells will affect battery pack performance to the degree it does not support the motor needs. In practice, this fact leads the EV battery manufacturers to assign excusive material and in some cases more than 60% more capacity in the battery pack design and manufacturing to overcome the discussed problems.

Li-ion battery cells, like in most electric vehicles, must not overcharged or over-discharged or else a cell might explode or permanently be damaged. Therefore, the main battery or module, switches off immediately and the battery charging/discharging is stopped—when a single cell in the battery pack reaches the manufacturer's electrochemical designed limits (e.g. above 4.2 Volts or below 2.6 Volts) or its temperature limit. Carry on charging or discharging the battery pack in these conditions is considered dangerous. This is done in spite of the fact that the rest of the cells are not fully charged.

It may be desired to provide a power pack (e.g., battery pack, solar panel etc.) with a switching grid and a controller that allows reconfiguring the power pack according to a temporal demand and/or current state of the power cells.

SUMMARY OF THE INVENTION

There is thus provided, in accordance with some embodiments of the present invention, a multi-level power cell pack switching circuitry that includes a plurality of first level (or "level-one") cell circuits for connecting a plurality of power cells. Each power cell has a positive terminal and a negative terminal. For each power cell in each of the first level cell circuits, a switch is provided for connecting the positive terminal of that power cell to a positive branching point of that first level cell circuit. For each power cell in each of the first level cell circuits, a switch is provided for connecting the negative terminal of that power cell to a negative branching point of that first level cell circuit. A diagonal connection with a switch is provided for connecting the negative terminal of one power cell of two adjacent power cells of said plurality of power cells of that first level cell circuit to the positive terminal of the other power cell of the two adjacent power cells of that first level circuit. Additional plurality of cell circuits of consecutively progressing levels from $2^{nd}$ level (or "level-two") to Nth level, are provided, N being an integer equal to or greater than 2, wherein an Mth level cell circuit of the additional cell circuits, M being an integer equal to or greater than 2 and not greater than N, comprises a plurality of M–1th level cell circuits, each M–1th cell circuit having a positive terminal and a negative terminal. The Mth level cell circuit includes a switch to connect a positive terminal of each of the M–1th cell circuits to a positive branching point of that Mth level cell circuit. The Mth level cell circuit also includes a switch to connect a negative terminal of each of the M–1th cell circuits to a negative branching point of that Mth level cell circuit. A diagonal connection with a switch is provided to connect the negative terminal of one M–1th level cell circuit of two adjacent M–1th level cell circuits of the plurality of M–1th level cell circuits of that Mth level cell circuit to the positive terminal of the other M–1th level cell circuit of the two adjacent cell circuits.

In some embodiments of the present invention, the switching circuitry is embodied in an electronic chip.

In some embodiments of the present invention, the switching circuitry also includes sensors for sensing one or a plurality of performance parameters of the power cells.

In some embodiments of the present invention, the performance parameters are selected from a group consisting of: current, voltage, temperature, pressure, humidity, impedance, SOC, SOH and recorded history.

In some embodiments of the present invention, the switching circuitry also includes a controller configured to operate the switches, so as to allow connecting power cells of said plurality of power cells or a plurality of cell circuits of said plurality of cell circuits of consecutively progressing levels, or a first combination thereof, in parallel, in series or in a second combination thereof, and to change any of the first or second combinations, and so as to allow connecting or disconnecting one or a plurality of the power cells, or one or a plurality of the cell circuits.

In some embodiments of the present invention, the switching circuitry also includes sensors for sensing one or a plurality of performance parameters of the power cells, and wherein the controller is configured to operate the switches according to a switching scheme based on the sensed one or a plurality of performance parameters. The sensors data is accumulated so that accurate SOC, heat dissipation and other parameters can be deducted from the cells over time, both when the battery is operated and also during rests.

In some embodiments of the present invention, the performance parameters are selected from a group consisting of: current, voltage, temperature, pressure, impedance, humidity, SOC, SOH and recorded history.

In some embodiments of the present invention, there is provided a power pack. The power pack includes a plurality of power cells, each of the power cells having a positive terminal and a negative terminal. The power pack also includes a multi-level power cell pack switching circuitry that includes a plurality of first level cell circuits for connecting the plurality of power cells, wherein, for each power cell in each of the first level cell circuits, a switch is provided for connecting the positive terminal of that power cell to a positive branching point of that first level cell circuit. For each power cell in each of the first level cell circuits, a switch is provided for connecting the negative terminal of that power cell to a negative branching point of that first level cell circuit. A diagonal connection with a switch is provided for connecting the negative terminal of one power cell of two adjacent power cells of said plurality of power cells of that first level cell circuit to the positive terminal of the other power cell of the two adjacent power cells of that first level circuit. The switching circuitry also includes additional plurality of cell circuits of consecutively progressing levels from $2^{nd}$ level to Nth level, N being an integer equal to or greater than 2, wherein an Mth level cell circuit of the additional cell circuits, M being an integer equal to or greater than 2 and not greater than N, comprises a plurality of M−1th level cell circuits, each M−1th cell circuit having a positive terminal and a negative terminal, wherein that Mth level cell circuit includes a switch to connect a positive terminal of each of the M−1th cell circuits to a positive branching point of that Mth level cell circuit, wherein that Mth level cell circuit includes a switch to connect a negative terminal of each of the M−1th cell circuits to a negative branching point of that Mth level cell circuit, and wherein a diagonal connection with a switch is provided to connect the negative terminal of one M−1th level cell circuit of two adjacent M−1th level cell circuits of the plurality of M−1th level cell circuits of that Mth level cell circuit to the positive terminal of the other M−1th level cell circuit of the two adjacent cell circuits.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A shows a level-one cell circuit with two battery cells of a battery pack, according to some embodiments of the present invention.

FIG. 1B shows a level-one cell circuit with four battery cells of a battery pack, according to some embodiments of the present invention.

FIG. 1C shows a level-one cell circuit with a plurality of battery cells of a battery pack, according to some embodiments of the present invention.

FIG. 2B shows a level-four cell circuit with a plurality of level-three, level-two and level-one cell circuits of a battery pack, according to some embodiments of the present invention.

FIG. 4 shows a level-three cell circuit with two level-two cell circuits of a battery pack, according to some embodiments of the present invention, where the cells (and the higher level cell-circuits) are all serially connected.

FIG. 10 illustrates an integrated controller EV chip system according to some embodiment of the invention.

FIG. 11A shows an integrated controller incorporating a power module and a logical module, with memory and communication interfaces.

FIG. 11B shows a leaner version of an integrated controller incorporating a power module and a logical module.

FIG. 11C shows a separate logical module with memory and communication interfaces.

DETAILED DESCRIPTION OF THE PRESENT INVENTION

Figure 1A:
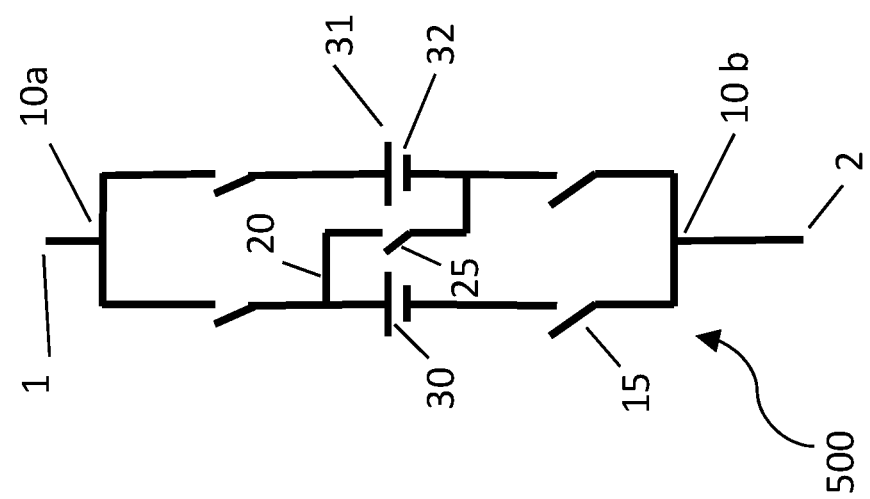
FIGS. 1A, 1B and 1C show three basic level ("level-one" or "first-level") cell circuits of a battery pack, according to some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

While embodiments of the present invention which are detailed below (and in the figures) relate to battery packs with a plurality of battery cells, it is noted that some embodiments of the present invention may relate to other types of power packs with other types of power cells, such as, photovoltaic cells of a solar panel, fuel cells, capacitors, etc.

Some embodiments of the present invention are aimed at providing a battery pack offering flexibility in the ratio between the number of battery cells connected in parallel and the number of cells connected in series in the battery pack, as well as the possibility of disconnecting weak cells or fully charged cells, while maintaining the remainder of the cell operative.

The ability to isolate a cell by switching can facilitate, in some embodiments, individually monitoring the real condition of cells, like open circuit voltage, resistance etc. This may be done, for example, by momentarily disconnecting (by manipulating the switches) one or few cells.

Some embodiments of the present invention relate to an Electronic Vehicle (EV) chip system for controlling a battery pack, and a battery pack thereof. An integrated controller EV chip system may include battery-cells, a power module that include the switching circuitry and a logical module that include controller configured to operate the switches. The different modules may be a part of the same integrated circuit or separate on several circuits in electronic chips.

Some embodiments of the present invention relate to a battery pack (power pack), for an electronic vehicle and an integrated controller EV chip system that controls the battery-pack. An EV battery pack may include a plurality of power cells, a power module and a logical module. In some embodiments of the present invention different modules may be on the same integrated chip. In some embodiments of the present invention the different modules may be separated to several chips.

At the basic level of a battery pack structure, according to some embodiments of the present invention, a plurality of battery cells is provided (hereinafter also referred to as "level one"). The battery cells may be connected to layers of switchers and branch into one or more higher levels. The multi-layer structure (namely the multi-level power cell pack switching circuitry), according to some embodiments of the invention, permits reconfiguring the battery cells circuits by switchers and therefore enables temporally connecting and disconnecting some battery cells to a load or to a charger according to a variety of considerations and conditions, and optimizing the battery pack performance in variety of aspects (e.g. the wear-out of the battery over the years).

Figure 1B:
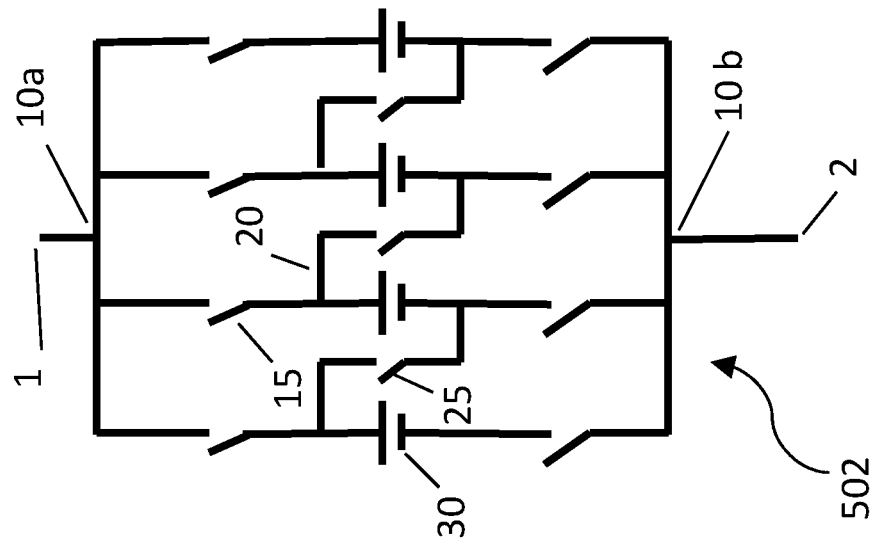
Figure 1C:
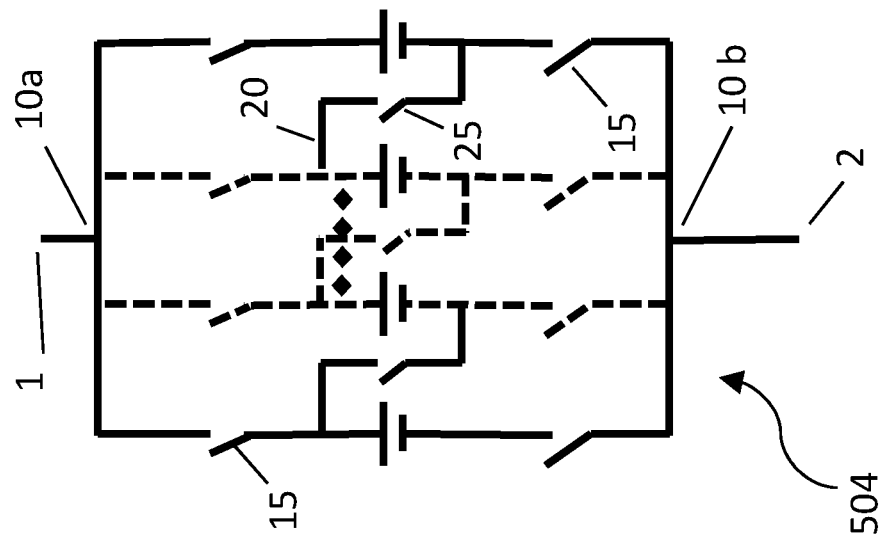

FIGS. 1A, 1B and 1C show three basic level ("level-one" or "first-level") cell circuits of a battery pack, according to some embodiments of the present invention.

FIG. 1A shows a level-one cell circuit with two battery cells of a battery pack, according to some embodiments of the present invention.

A level-one cell circuit 500, which is also referred hereinafter as a "branch" may include a plurality of battery-cells 30 (two are shown in the example of FIG. 1A, four in FIG. 1B and a plurality in FIG. 1C). Each cell 30 has a positive pole 31 and a negative pole 32. Each pole of each cell may be connected to a switch 15. The plurality of battery cells 30 may be connected via the switches to either or both of two branching points 10a and 10b via the switches 15, so that when all of the switches 15 are on (e.g. electrically connected), the cells are connected in parallel between the two branching points. A diagonal switched connection 20 (may also be referred to as a cross switched connection) with a switch 25 may connect a pole of a certain polarity (31 or 32) of a cell 30 of the branch to a pole of an opposite polarity (32 or 31 respectively) of a neighboring cell of the branch, allowing serial connection between these battery cells (that would require switching off, one switch separating a pole of that cell from the branching point, and switching off another switch separating the opposite pole of the neighboring cell from the opposite branching point. The two battery cells at opposite ends of a branch, may be connected by a diagonal switched connection as well, thus allowing connecting and disconnecting any cell from a serial circuit of the branch. Level-one cell circuit 500 includes two external terminals—1 (positive) and 2 (negative)—designed for connecting the cell circuit to a load or, as described hereinafter, to other cell circuits forming a battery-pack, according to some embodiments of the present invention.

A "switch" in a battery pack may be omitted (leaving a disconnected link) if it is in a position that should be always disconnected (off); or replaced with direct permanent connection if in position that should be always connected (on).

FIG. 1B shows a level-one cell circuit 502 with four battery cells 30 of a battery pack, according to some embodiments of the present invention.

FIG. 1C shows a level-one cell circuit 504 with a plurality of battery cells 30 of a battery pack, according to some embodiments of the present invention.

A level-two cell circuit may include a plurality of level-one cell circuits, which, similarly to the connections of the cells in level-one cell circuit, are connected to two opposite branching points. Each of the branching points of the level-one cell circuit (actually a pole of the level-one cell circuit) may be connected to a switch. The plurality of level-one cell circuits may be connected via the switches to either of two branching points of the level-two cell circuit via the switches, so that when all of the switches are on the level-one cell circuits are connected in parallel between the two branching points. A diagonal switched connection may connect a pole of a certain polarity of a level-one cell circuit to a pole of an opposite polarity of a neighboring level-one cell circuit, allowing serial connection between these level-one cell circuits (that would require switching off one switch separating a pole of that level-one cell circuit from the branching point of the level-two cell circuit, and switching off another switch separating the opposite pole of the neighboring level-one cell circuit from the opposite branching point.

Figure 2A:
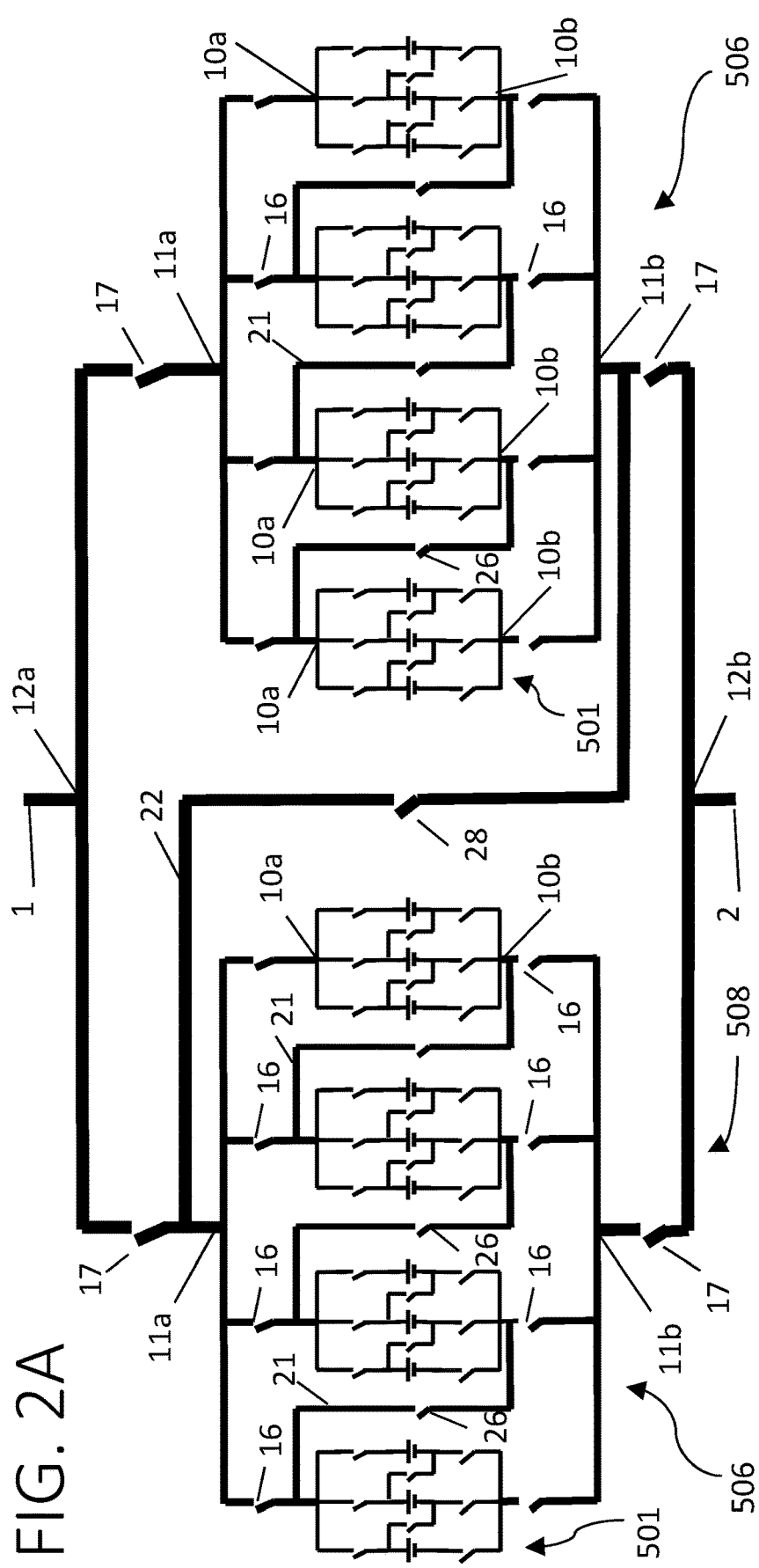
FIG. 2A shows a level-three cell circuit with two level-two and eight level-one cell circuits of a battery pack, according to some embodiments of the present invention.

FIG. 2A shows a level-three cell circuit 508 with two level-two cell circuits 506 of a battery pack, according to some embodiments of the present invention. The overall design principle demonstrated in the level-one cell circuit is repeated in the design principle demonstrated in the level-two and level-three cell circuits.

In the level-two cell circuit 506, the opposite poles 10a and 10b of the level-one cell circuits 501 are each connected via switched connections 16 to opposite poles 11a and 11b respectively (maintaining their polarity), so as to form a parallel connection (when switches 16 are on), while a diagonal switched connection 21, with switch 26, is provided to allow electrically connecting or disconnecting between opposite poles 10a or 10b of a level-one cell circuit and corresponding opposite poles 10b or 10a (respectively) of an adjacent level-one cell circuit 501, so as to form a serial connection (this requires switching off switches 16 of opposite pole 10a or 10b of a level-one cell circuit 501 and corresponding opposite pole 10b or 10a (respectively) of the adjacent level-one cell circuits 501).

Similarly, in level-three, cell circuit 506 the opposite poles 11a and 11b of the level-two cell circuits 506 are each connected via switched connections 17 to opposite poles 12a and 12b respectively (maintaining their polarity), so as to form a parallel connection (when switches 17 are on), while a diagonal switched connection 22, with switch 28, allows electrically connecting or disconnecting between opposite poles 11a or 11b of a level-two cell circuit 506 and corresponding opposite poles 11b or 11a (respectively) of an adjacent level-two cell circuit 506, so as to form a serial connection (this requires switching off switches 17 of opposite pole 11a or 11b of a level-two cell circuit 506 and corresponding opposite pole 11b or 11a (respectively) of the adjacent level-two cell circuits 506).

According to some embodiments of the present invention, this modular design may be further implemented at higher level cell circuits, so that by controlling the various switches practically almost any electrical arrangement may be achieved, according to temporal needs.

In general, according to some embodiments of the present invention, a power pack may include a plurality of power cells, each of the power cells having a positive terminal and a negative terminal. The power pack may include a multi-level power cell pack switching circuitry comprising: a plurality of first level cell circuits for connecting the plurality of power cells, wherein, for each power cell in each of the first level cell circuits, a switch is provided for connecting the positive terminal of that power cell to a positive branching point of that first level cell circuit, wherein, for each power cell in each of the first level cell circuits, a switch if provided for connecting the negative terminal of that power cell to a negative branching point of that first level cell circuit, and wherein a diagonal connection with a switch is provided for connecting the negative terminal of one power cell of two adjacent power cells of said plurality of power cells of that first level cell circuit to the positive terminal of the other power cell of the two adjacent power cells of that first level circuit.

The power pack may also include additional cell circuits of consecutively progressing levels from $2^{nd}$ level to Nth level, where N is an integer equal to or greater than 2. An Mth level cell circuit of the additional cell circuits (where M is an integer equal to or greater than 2 and not greater than N) including a plurality of M−1th level cell circuits, each M−1th cell circuit having a positive terminal and a negative terminal, wherein that Mth level cell circuit includes a switch to connect a positive terminal of each of the M−1th cell circuits to a positive branching point of that Mth level cell circuit, wherein that Mth level cell circuit includes a switch to connect a negative terminal of each of the M−1th cell circuits to a negative branching point of that Mth level cell circuit, and wherein a diagonal connection with a switch is provided to connect the negative terminal of one M−1th level cell circuit of two adjacent M−1th level cell circuits of the plurality of M−1th level cell circuits of that Mth level cell circuit to the positive terminal of the other M−1th level cell circuit of the two adjacent cell circuits.

The highest level cell circuit forms a battery pack. The branching points of the highest level cell circuit serve as terminals of the battery pack, positive or negative (determined by the actual design, conforming to the polarity of the basic cells at level-one cell circuit). The battery pack may be used to power an electric system (e.g. an electric vehicle or other electrical device or serve as a power pack, e.g., when the basic cells are solar panel cells, etc.).

According to some embodiments the switches (at the various levels) of the battery pack and the switching circuitry may be incorporated in a power module, which is wired (e.g., directly or via matching plug and socket) to the battery cells.

An integrated controller, according to some embodiments of the present invention, may include one or a plurality of semiconductor switcher chips, each of the switcher chips designed to include the switches of a battery pack according to some embodiments of the invention. The switches are the switches that connect or disconnect battery cells (at level-one cell circuits) and cell circuits to or from branching points, and the switches of the diagonal switched connections. A switcher-chip may include a monolithic integrated circuit or a plurality of integrated circuits (e.g., chip sets).

An integrated controller, according to some embodiments of the invention, may be configured, inter-alia, to operate the switches so as to achieve: (1) serial connection of some or all cells of the level-one cell circuit cells, and/or some or all higher-level cell circuits; (2) parallel connection of some or all cells of the level-one cell circuit or circuits, and/or higher-level cell circuit or circuits; (3) serial connection of some cells of the level-one cell circuit or circuits, and/or higher-level cell circuits, and parallel connection of some cells of the level-one cell circuit or circuits, and/or higher-level cell circuits; and (4) connection or disconnection of one or a plurality of cell circuits (of any level) from the battery pack.

In some embodiments of the present invention, an integrated controller may comprise a power module and a logic module. The integrated controller may include a processor or processors, for executing a program or programs to operate the switches. The power module may be controlled by a logical module as a full integrated controller EV chip system, or alternatively by a computing device (e.g., of an electric vehicle or other system).

A logical module, according to embodiments of the invention, may include a communication module configured to communicate with other components of the battery pack and/or with the electric system powered by the battery pack, and/or with another device or devices.

A power module may include, but not limited to, the following devices: Silicon-controlled rectifier (SCR), Thyristor, Gate turn-off thyristor (GTO), Triac, Bipolar junction transistor (BJT), Power MOSFET, Insulated-gate bipolar transistor (IGBT), MOS-controlled thyristor (MCT), Integrated gate-commutated thyristor (IGCT).

In some embodiments a power module may comprise a standard bidirectional MOSFET, which is an anti-serial configuration of MOSFET.

In some embodiments a chip may comprise opto-isolator or optocoupler.

In some embodiments a logical module may be configured to communicate with a vehicle processor, e.g., updating performance and other conditions and sending alerts. A logical module may also be configured to communicate with other logical modules in the same device/vehicle or other devices/vehicles.

In some embodiments a power module is combined with a logical module on the single chip.

A logical module, according to some embodiments of the invention, comprises a processor that is configured to integrate the energy demands/supply of the operator of the device/vehicle with predetermined considerations such as the condition of the battery pack and its performance history as well as external inputs. The processor may calculate an optimum switching combination for the battery pack at any given time, to fulfil energetic requirements of the device/vehicle, e.g., according to predetermined algorithms (that can be updated from time to time via the communication module). Inputs fed to the processor (e.g., via an input device) may include information from sensors monitoring various conditions of the battery-pack such as current, voltage, temperature, pressure, impedance, etc. In addition, relevant external input may be available as well, for example like maps, trip program, traffic loads and whether reports historic data of energy demands and supply availability.

The algorithms may be designed to provide battery cells arrangement solutions to a variety of conditions (default and/or complex). The algorithms may take into account performance history of the battery pack with regards to a variety of energy demand and supply conditions. The algorithms may include learning abilities.

The logical module may include a various communication ports, some of which may be wireless. Output communication may include updating of the device/vehicle processor about the condition of the battery pack, forwarding alerts, etc. The logical module may be configured to communicate with external systems.

A battery pack according to some embodiments of the invention may be designed for use to provide electrical power to an electrical device (e.g., an electrical vehicle), or be used as an energy device.

A vehicle may be any type of vehicle, such as a car, train, motorcycle, bicycle, elevator, boat, ship, submarine, hovercraft, aircraft, helicopter, spacecraft, drone, robot, etc. An electric device may be for example any electronic device, such as a smartphone, cellphone, mobile computer, tablet, satellite, robot, three- or single-phase motor, electronic apparatus etc. An energy device may be, for example, an uninterruptible power supply (UPS), a charging station, a wind turbine, a hydroelectric station, solar energy system, thermal energy system, renewable energy source system, power plant etc.

A battery pack according to some embodiments of the invention, facilitates faster and complete charging, as well as faster and deeper battery discharging. Battery cells wear-out may be maintained well balanced, thereby maximizing battery life, optimizing its performance, etc. The potential of the dynamic energy range may be fully, or substantially fully, used, while maintaining current charge and discharge limits that affect the wear-out of the battery cells. Wear-out may be controlled by current reduction and partial usage of certain sensitive cells, or entirely disconnecting specific problematic battery cells.

Due to the structural and functional flexibility of the battery pack, according to some embodiments of the invention, it is possible to combine different types of energy storage sources in a single package, including, for example, different chemistry types of batteries with different voltages and current limitation, such as capacitors and fuel cells.

Due to the structural and functional flexibility of the battery pack, according to some embodiments of the invention, it is possible to generate a variety of voltage and current outputs in direct current or alternate current in different frequencies and phases. This may reduce the need of using converters or inverters. Some embodiments of this ability are illustrated in tables 1 and 2.

Optimization of the battery-pack utilization, according to some embodiments of the invention, may also increase the battery pack safety and or reducing energetic cost of other safety mechanisms (e.g. Fuses). The flexibility of the pack structure, its optimal usage and the improved ability to recuperate kinetic energy back to the battery cells, may allow reducing the battery pack size by removing redundant battery cells, therefore reducing overall weight and cost.

FIG. 2B shows a level-four cell circuit 510 with a plurality of level-three cell circuits 508 of a battery pack, according to some embodiments of the present invention.

Figure 3A:
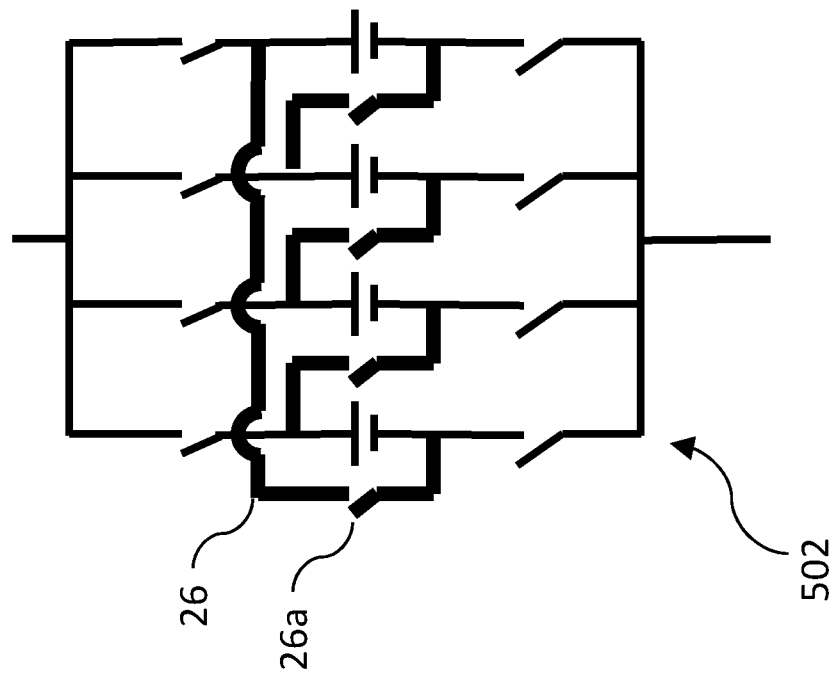
FIG. 3A shows a level-one cell circuit with a plurality of battery cells of a battery pack, and a cross connection for obtaining a serial configuration, according to some embodiments of the present invention.

FIG. 3A shows a level-one cell circuit 502 with a plurality of battery cells of a battery pack, and a cross connection 26 with a switch 26a for obtaining a serial configuration, according to some embodiments of the present invention. Cross connection 26 provides cylindrical topology to the branch. Such topology may facilitate, in the case of serial connections, disconnecting any cell regardless to its position.

Figure 3B:
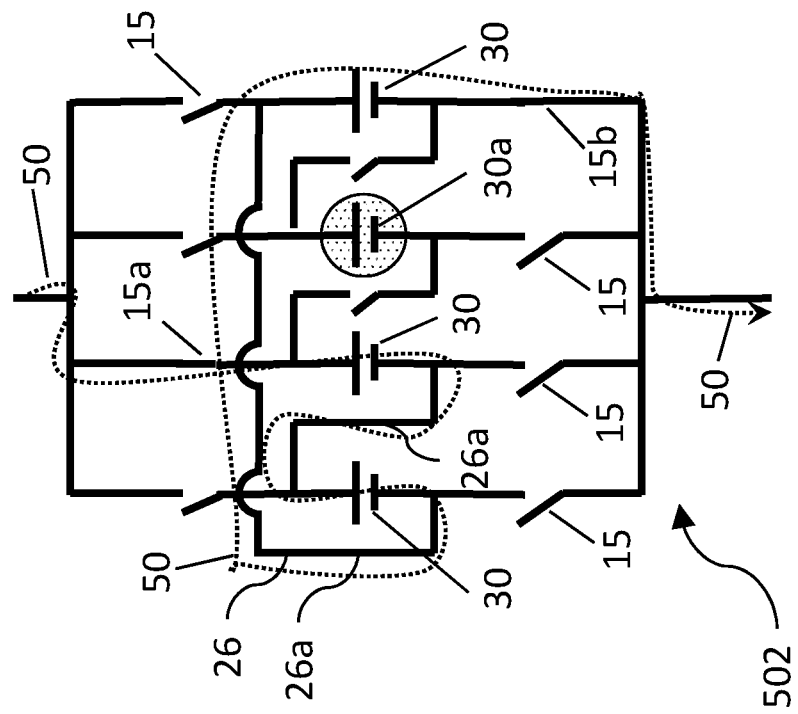
FIG. 3B shows achieving a serial connection of the cells of the cell circuit, using cross connection with a disconnected cell, according to some embodiments of the invention.

FIG. 3B shows achieving a serial connection of the cells of the cell circuit 502 using cross connection 26, according to some embodiments of the invention. Switches 15 are maintained open (off), except for 15a and 15b which are closed (on), as well as switches 26a which are also closed (on) allow a valid serial connection (indicated by the dotted line 50) of three of the four cells. Manipulating the switches differently can result in serial connection of two, three, or four (in fact any number of the number of cells in the cell circuit). Similarly, at higher level cell circuits, any combination of serially connected cell circuits may be achieved by controlling the switches accordingly.

It is noted, however, that cross connection 26 is not necessary to obtain serial connection of the battery cells, as demonstrated in the next figure.

FIG. 4 shows a level-three cell circuit 508 with two level-two cell circuits of a battery pack, according to some embodiments of the present invention, where the cells (and the higher level cell-circuits) are all serially connected. In order to obtain serial connection all switches marked 27 are closed (on).

Figure 5:
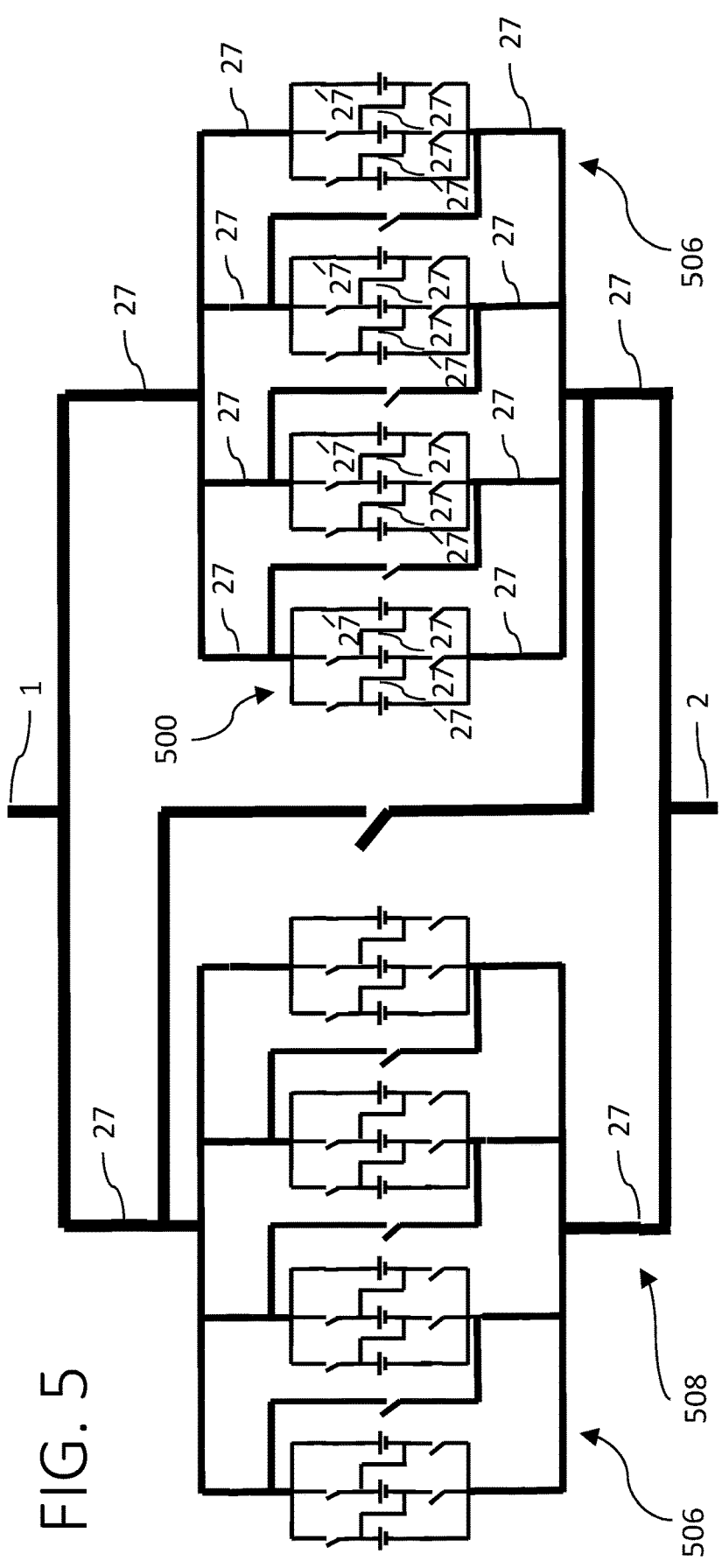
FIG. 5 shows a level-three cell circuit with two level-two cell circuits of a battery pack, according to some embodiments of the present invention, where all of the cells of the level-one circuits are connected in series, whereas the higher level cell circuits are connected in parallel.

FIG. 5 shows a level-three cell circuit 508 with two level-two cell circuits 506 of a battery pack, according to some embodiments of the present invention, where all of the cells of the level-one circuits are connected in series, whereas the higher level cell circuits—level-one cell circuits 500, and level-two cell circuits 506 are connected in parallel. In order to achieve that the switches marked as 27 are closed (on), while other switches are kept open (off). While only the switches 27 of the right hand side level-two cell circuit, and of the higher level (level-three) circuit are marked, the corresponding switches in the left hand side level-two cell circuit are switched on accordingly.

Figure 6:
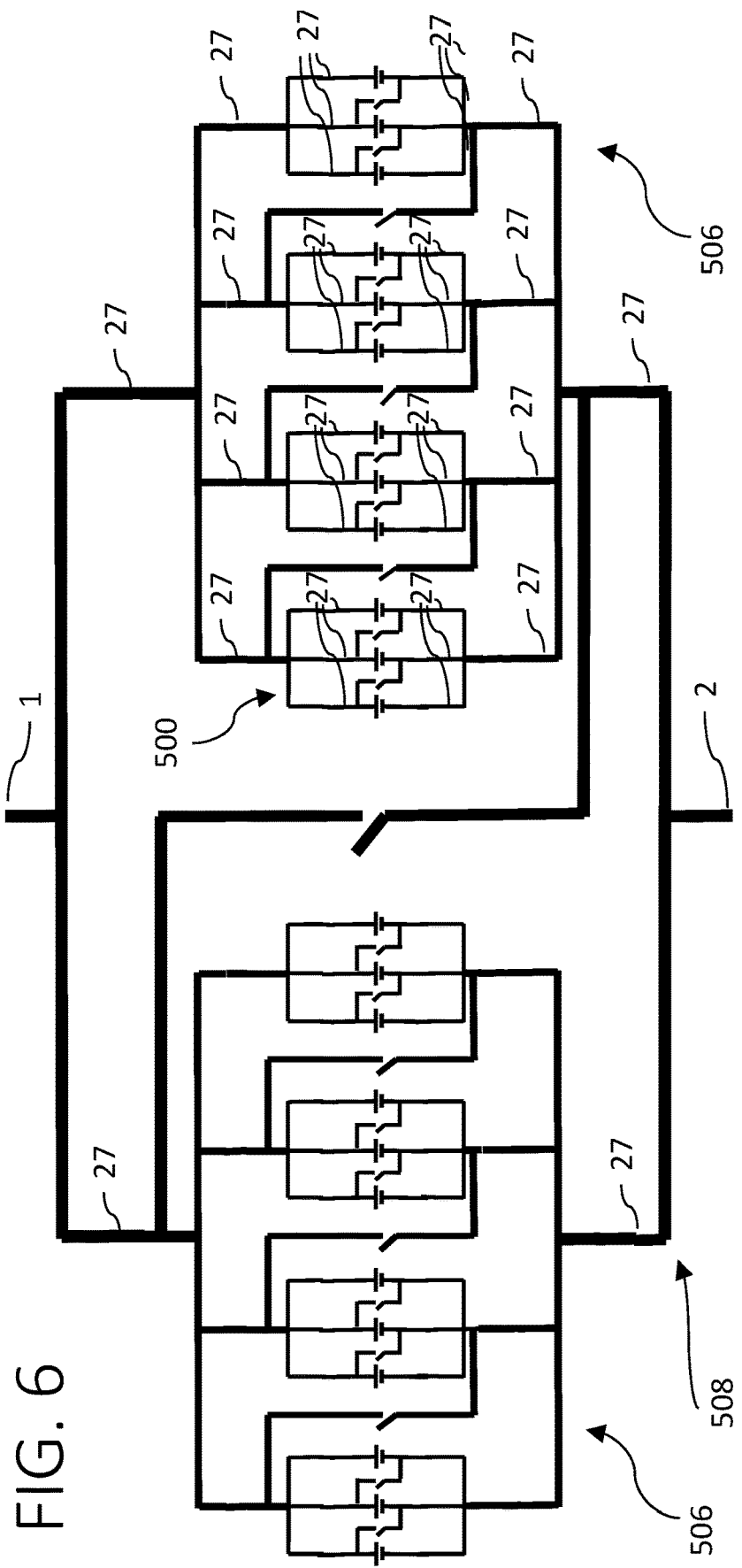
FIG. 6 shows a level-three cell circuit with two level-two cell circuits of a battery pack, according to some embodiments of the present invention, where the cells of the level-one circuits and the higher level cell circuits are all connected in parallel.

FIG. 6 shows a level-three cell circuit 508 with two level-two cell circuits 506 of a battery pack, according to some embodiments of the present invention, where the cells of the level-one circuits and the higher level cell circuits are all connected in parallel. In order to achieve this configuration, the switches marked 27 are closed (on), while other switches are kept open (off). Again, while only the switches 27 of the right hand side level-two cell circuit, and of the higher level (level-three) circuit are marked, the corresponding switches in the left hand side level-two cell circuit are switched on accordingly.

Figure 7:
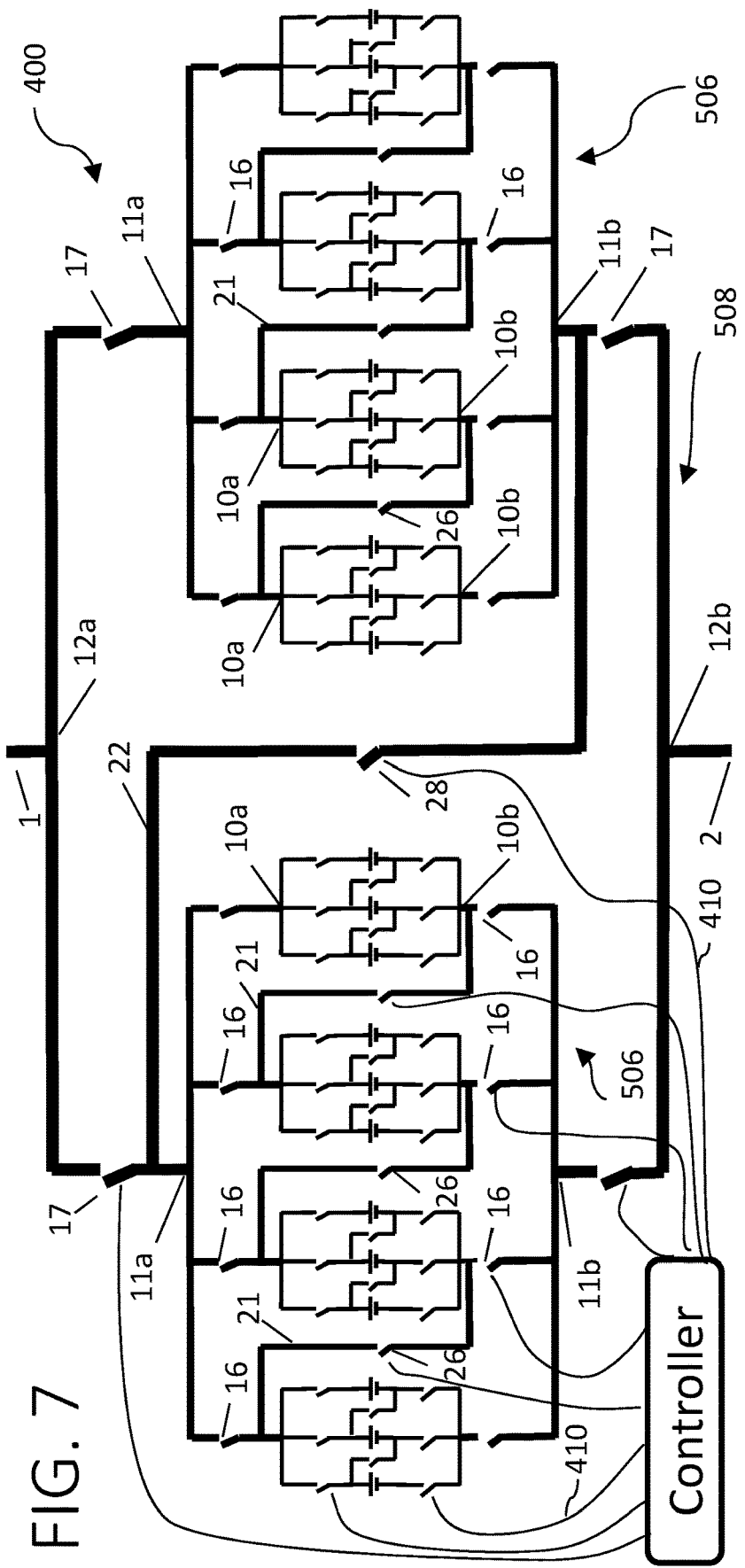
FIG. 7 illustrates a battery pack according to some embodiments of the present invention.

FIG. 7 illustrates a battery pack 400 according to some embodiments of the present invention. In the drawn embodiment, a level-three cell circuit 508 with two level-two cell circuits 506 are provided. The switches are electrically connected and operated by controller 410 (only a few connections are shown in the drawing, for brevity). Controller 410 may also be linked to terminals 1 and 2 and monitor the battery pack output and load. Controller 410 may operate the switches based on an algorithm that monitors certain global conditions, e.g., temporal output, temporal load, temporal voltage across the terminals, temporal current, temporal temperature, etc. relating to the battery pack, or local conditions, e.g., temporal output, temporal load, temporal voltage across the terminals, temporal current, temporal temperature, etc., relating to a cell or a cell circuit of any hierarchy level.

Figure 8:
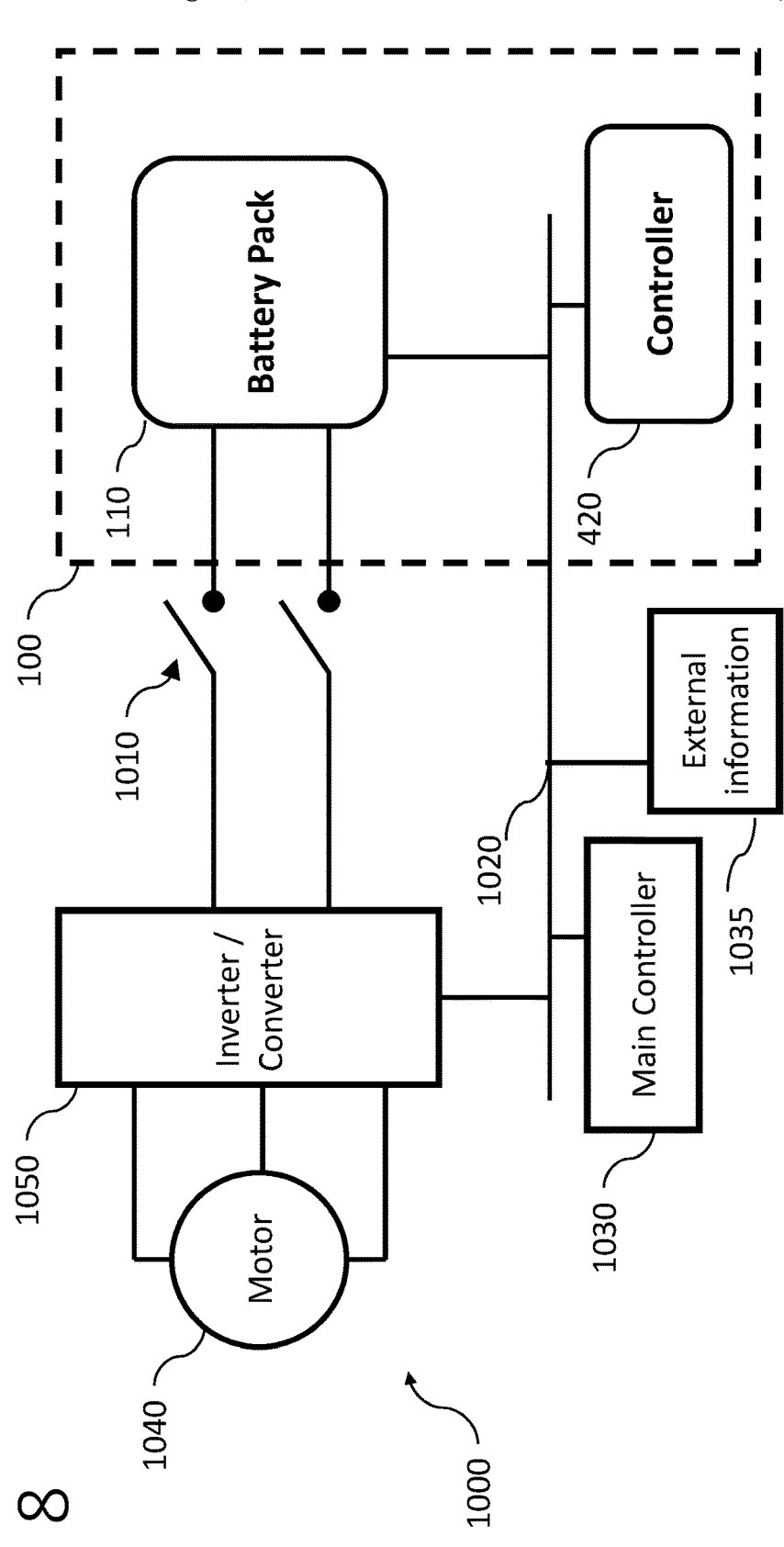
FIG. 8 illustrates an EV power train system according to some embodiments of the present invention.

FIG. 8 illustrates an EV powertrain system 1000 according to some embodiments of the present invention. EV powertrain system 1000 may include a battery pack 100 according to some embodiments of the invention (e.g., like the battery packs described hereinabove). Battery pack 100 may include battery cells 110 and EV-Chip controller 410 that includes a logical module and a power module. As shown, system 1000 includes a motor 1040 connected to an inverter or converter 1050 that is electrically connected to the output terminals 1010 of battery pack 100, thereby receiving current output from it. The current can be reversed when the vehicle is decelerating. Battery pack 100 may be charged (if the battery cells are rechargeable) by absorbing kinetic energy of the car. System 1000 may also include a main controller 1030 and a bus 1020 that allows the components to communicate. External information port 1035 may be used to connect to other systems, such as, for example, a navigation system.

Figure 9:
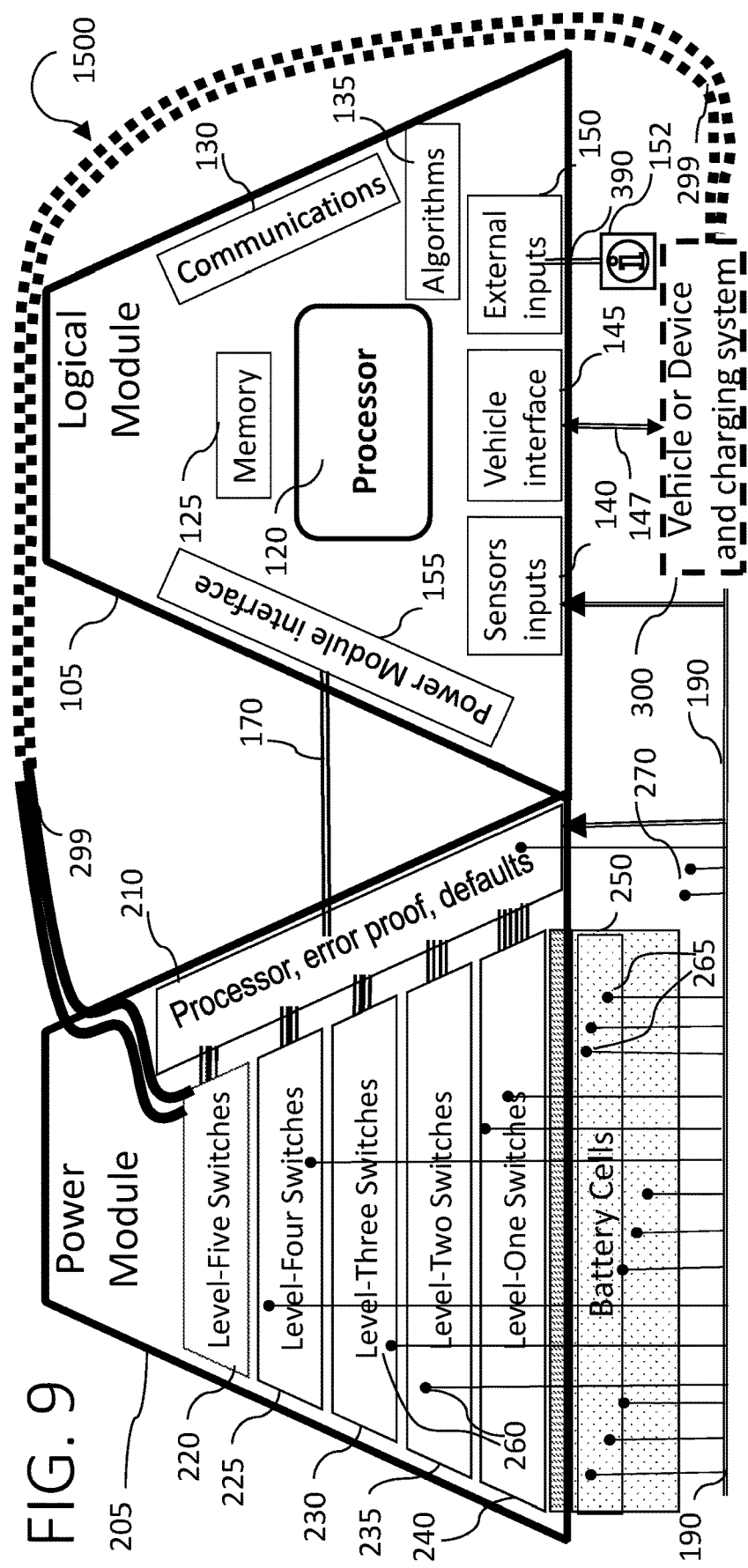
FIG. 9 illustrates an integrated controller EV Chip System according to some embodiment of the invention.

FIG. 9 illustrates an integrated controller EV chip system, all the components according to some embodiment of the invention, are located in a single chip. Integrated controller EV chip system 1500 may include a processing device (e.g., one or a plurality of processors) that can execute algorithms to operate the EV battery pack efficiently when connected to the electric engine. Integrated controller EV chip system 1500 may generally include logical module 105, power module 205 connected to battery cells 250 (in battery cell circuit formations, in various hierarchy levels).

Logical module 105 may use various inputs for determining a desired switching configuration for battery cells 250 of the battery pack. Logical module 105 may include, for example, sensor input port 140 for receiving sensor data from one or a plurality of sensors, vehicle interface port 145 for interfacing with one or a plurality of electronic systems of a vehicle, external input port 150 for obtaining external inputs, etc. A communication interface 130 may be provided for communication with other ports (e.g., wireless communication interface). Sensor input port 140 may be used for collecting physical information from sensors 265 linked to and/or from battery cells 250, from sensors 260 linked to and/or from switches in various levels (e.g., level one 240, level-two 235, level three 230, level four 225, level five 220) of switching circuits and/or power module, collect ambient conditions with sensors 270, etc. The sensors may collect data relating to conditions, such as, current, voltage, temperature, pressure, fire, etc. The sensed data may be delivered, for example, via communication cable 190 to sensor input 140. Processor 120 may execute an algorithm or algorithms 135 for determining required or desired switching configuration, for example, by taking into account the electrical demands of vehicle (or other electrical device) 300 based on the sensed data, historical information saved in memory 125, and/or external information 390 like maps, traffic loads, weather reports costs consideration, pollution consideration etc., obtained vial link 152 by external input terminal 150. The processor 120 may forward the determined switching configuration, e.g., using interface module 155 via communication cable or other connection to power module 205, in some embodiment the connection between the logical module and power module may be via processor 210 that may be configured to perform proof reading or other safety measures to avoid forbidden (illegal) switching configurations, and/or to set of defaults to support extreme conditions. Processor 210 may also be linked to the sensors via communication cable 190. The processor 210 may be configured to perform switching according to the switching configuration obtained from processor 120 and generate switching commands to the switches of the cells and the cell circuits of the various levels e.g., levels 220, 225, 230, 235 and 240).

The ability to reconfigure the battery pack temporally and in a dynamic manner is aimed at matching environmental and engine changing needs, at compensating different time degradation effects and malfunctions of part of the cells, and at redefining the battery specification so as to largely affect the ability to use it in different scenarios with changing parameters (e.g., temperature changes). The above described mechanism may be used for a charging process, where current flows in the opposite direction from the charger or grid, connected to the vehicle 300, to battery cells 250, via terminal and electricity cable 299 and the switches in power module 205.

FIG. 10 illustrates an integrated controller EV chip system according to some embodiment of the invention. The integrated controller EV chip system depicted in FIG. 10 includes a processing device that can run algorithms to utilize the EV battery efficiently to cater for the electric engine temporal needs; as well as the charging process either by absorbing decelerating energy or charging from external electric grid In the depicted embodiment a logical module 120 and a power module 205 are located on the same chip (101 & 102), connected to battery cells that are divided to subsets 250, each subset comprising a plurality of battery cells. Each of the subset is controlled by integrated controller EV chip 101. A main integrated controller EV chip 102 controls the entire system, by controlling the plurality of integrated controller EV chips 101.

Battery cells 250 are connected to power module switcher chip 205 of integrated controller EV-Chip 101 via wires 245. The performance of battery cells 250 may be monitored using sensors 265 and the sensed data may be directed to the communication port 130 via communication cable 190. The switching may be dictated by main integrated controller EV chip 102 that sends switching commands to the logical module 120 of integrated controller EV chip 101 of each subset of cells via communication ports 130 and cable 146. The logical module 120 of integrated controller EV chip 101 may perform error checking and operate the switches using control circuit 170. Terminals 297 of the battery cell subset controlled by integrated controller EV chip 101 are connected to integrated controller EV chip 102 via the power module switcher chip 205 through cables 298. Switching may be commanded by logical module 120 of integrated controller EV chip 102 that sends switching commands to by control circuit 170. Main terminals and cable 299, allow connecting the battery pack to the vehicle electric system 301 and charging system.

The vehicle processor 302 may communicate the electric requirements of the vehicle to the main logical module 102 via the communication port 130 and communication cable 147. Sensors 265 monitoring battery 250 conditions, their signals are sent (190) to the main Logical-Module-Chip via the communication port 130. External information 390 (e.g. weather report, ambient condition, traffic loads) may be delivered to the main logical module 102 via communication port 130. The memory unit 125 may be used to save historic data including the data on battery cells performance, trip plane and alike. In logical module 120 of the main integrated controller EV chip 102, may be configured to calculate optimal temporal switching configuration for the battery pack according to the inputs, and send the switching configuration to the subset integrated controller EV chips 101 and to the power module 205 of the main integrated controller EV chip 102.

Figure 11A:
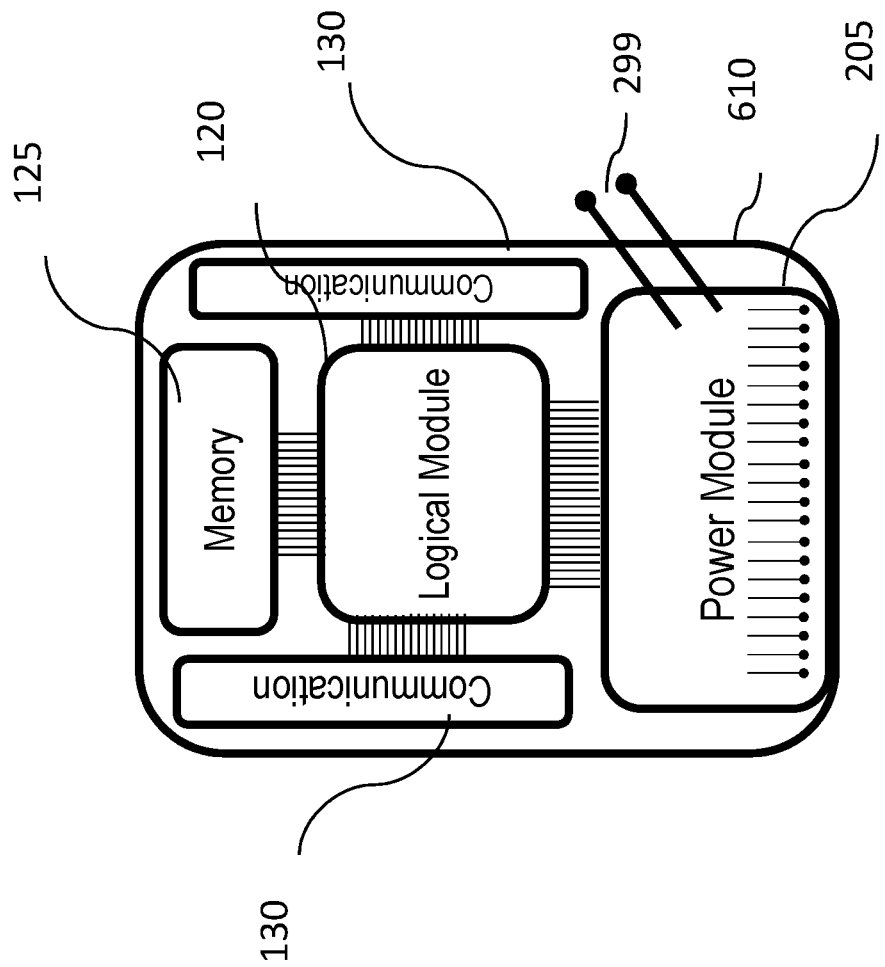
FIG. 11A-C illustrates various embodiments of power module and logical module, according to some embodiments of the present invention, for configuring battery cells.
Figure 11B:
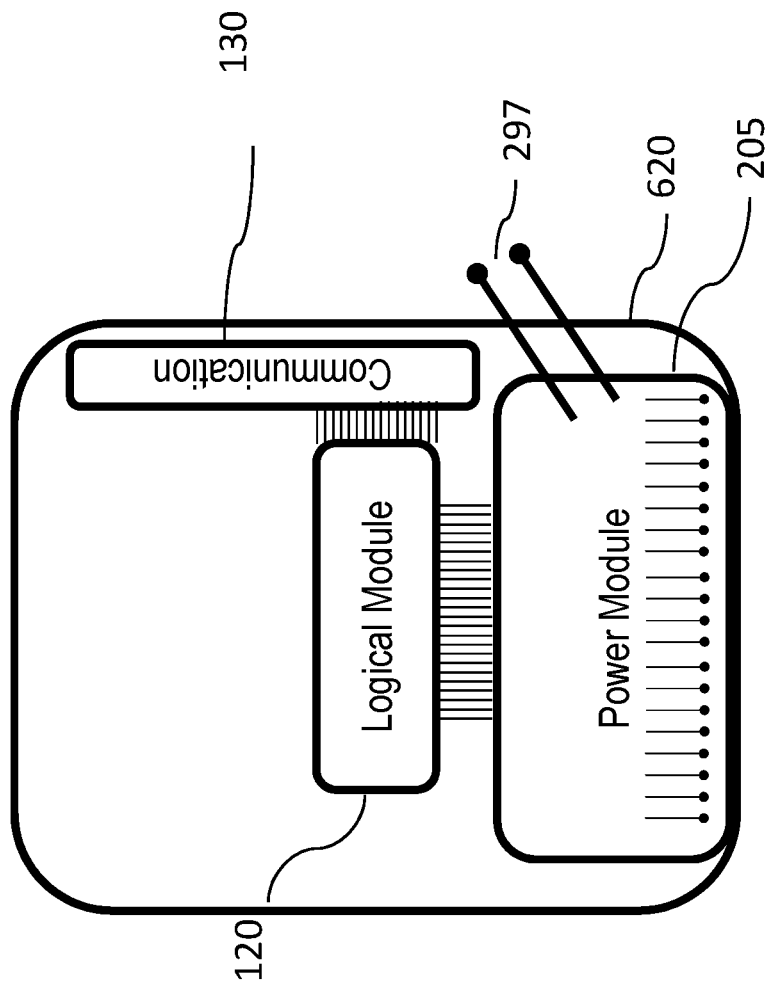
Figure 11C:
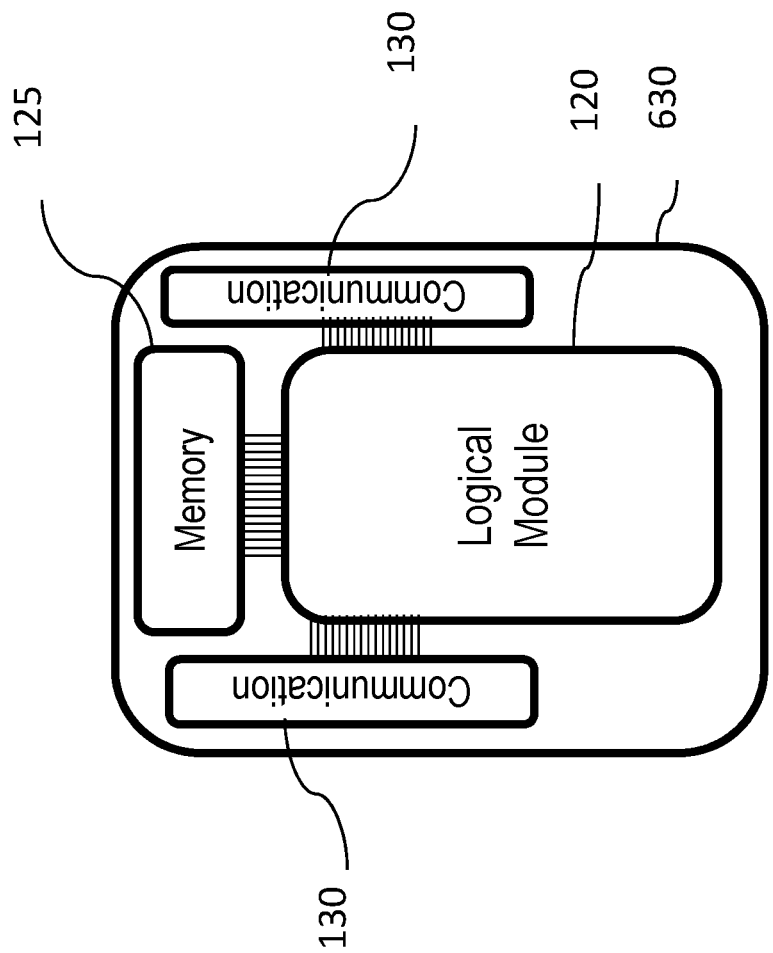

FIG. 11A-C illustrates various embodiments of power module and logical module, according to some embodiments of the present invention, for configuring battery cells.

FIG. 11A shows an integrated controller 610 incorporating a power module and a logical module, with memory and communication interfaces. Integrated controller 610 may include power module 205, logical module 120, memory 125, communication interfaces 130 and main terminals 299, allow connecting the battery pack to the vehicle electric system. Such controller may be used, for example as a high-level controller, that may obtain input 690 from a vehicle such as commands to operate the switches of the power module in a certain manner or data indicative of the vehicle's current power needs that is processed by the logical module to generate switching commands to the power module.

FIG. 11B shows a leaner version of an integrated controller 620 incorporating a power module 205, a logical module 120, with communication module 130, and terminals 297 of electric system. Such controller may be used, for example, as a low-level controller, that may obtain vehicle commands operate the switches of the power module in a certain manner.

FIG. 11C shows a controller 630 with a separate logical module 120 and with memory 125 and communication interfaces 130. Such controller may be used, for example, as a high-level controller to control separate power module or power modules, so as to control the switches of one or a plurality of battery packs.

FIG. 11D-G illustrates various embodiments plurality of a leaner versions of integrated controllers for different use and sophistication. The figures do not describe the particular communication rather emphasize the hierarchy of structures.

Figure 11D:
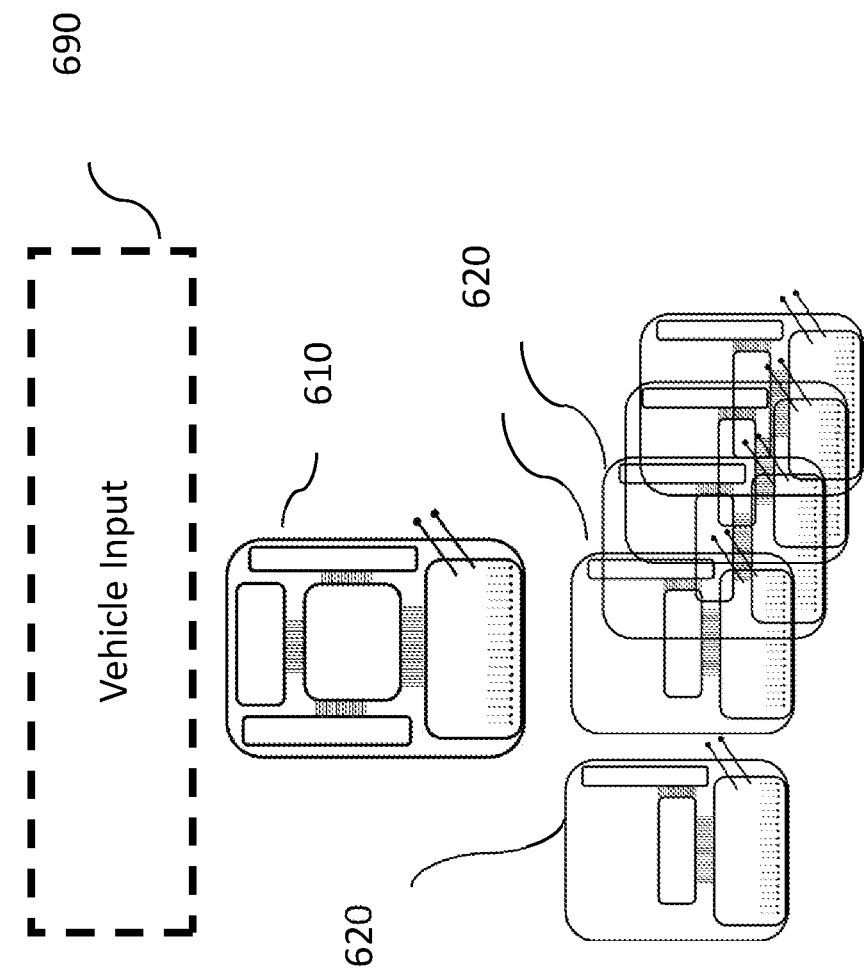
FIG. 11D shows a plurality of a leaner version of an integrated controller electronically linked to and controlled by an integrated controller incorporating a power module and a logical module, with memory and communication interfaces.

FIG. 11D shows a plurality of a leaner version of an integrated controller 620 electronically linked to and controlled by an integrated controller 610 incorporating a power module and a logical module, with memory and communication interfaces. Such arrangement may be suitable for obtaining vehicle commands by the top integrated controller 610, which distributes corresponding switching commands to the plurality of integrated controllers 620, or for obtaining data indicative of the vehicle's current power needs that is processed by the logical module to generate switching commands to the power module, which distributes these switching commands to the power modules of the plurality of integrated controllers 620. In this example the vehicle input 690 may either specification vehicle's energetic needs or specific command for battery switching arrangement.

Figure 11E:
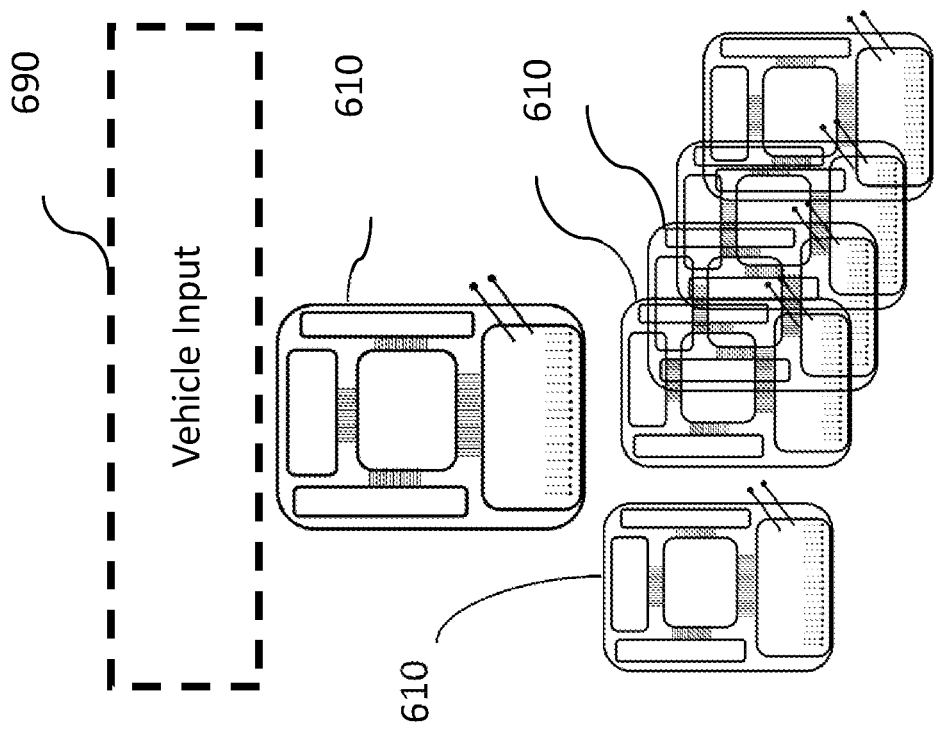
FIG. 11E shows a plurality of an integrated controller incorporating a power module and a logical module, with memory and communication interfaces, electrically linked and controlled by another integrated controller incorporating a power module and a logical module, with memory and communication interfaces.

FIG. 11E shows a plurality of an integrated controller incorporating a power module and a logical module, with memory and communication interfaces, electrically linked and controlled by another integrated controller incorporating a power module and a logical module, with memory and communication interfaces, Such arrangement may be suitable for obtaining vehicle commands by the top integrated controller 620, which distributes corresponding switching commands to the plurality of integrated controllers 620, or for obtaining data indicative of the vehicle's current power needs that is processed by the logical module to generate switching commands to the power module, which distributes these switching commands to the power modules of the plurality of integrated controllers 620.

Figure 11F:
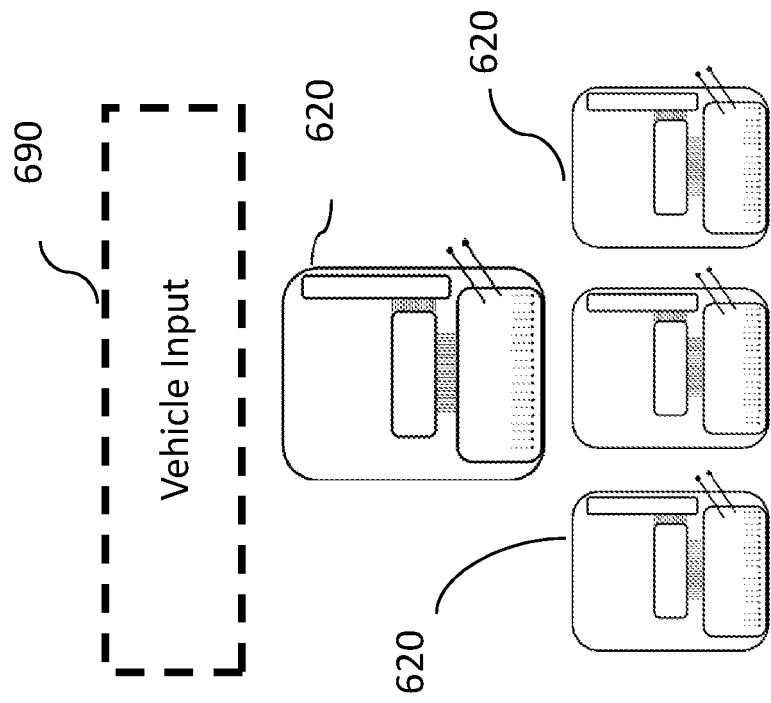
FIG. 11F shows a plurality of a leaner version of an integrated controller electrically linked to and controlled by another leaner version of an integrated controller.

FIG. 11F shows a plurality of a leaner version of an integrated controller 620 electrically linked to and controlled by another leaner version of an integrated controller 620, according to some embodiments of the invention. Such arrangement may be suitable for obtaining vehicle commands by the top integrated controller 620, which distributes corresponding switching commands to the plurality of integrated controllers 620. In this example the vehicle input 690 is a command for battery switching arrangement.

Figure 11G:
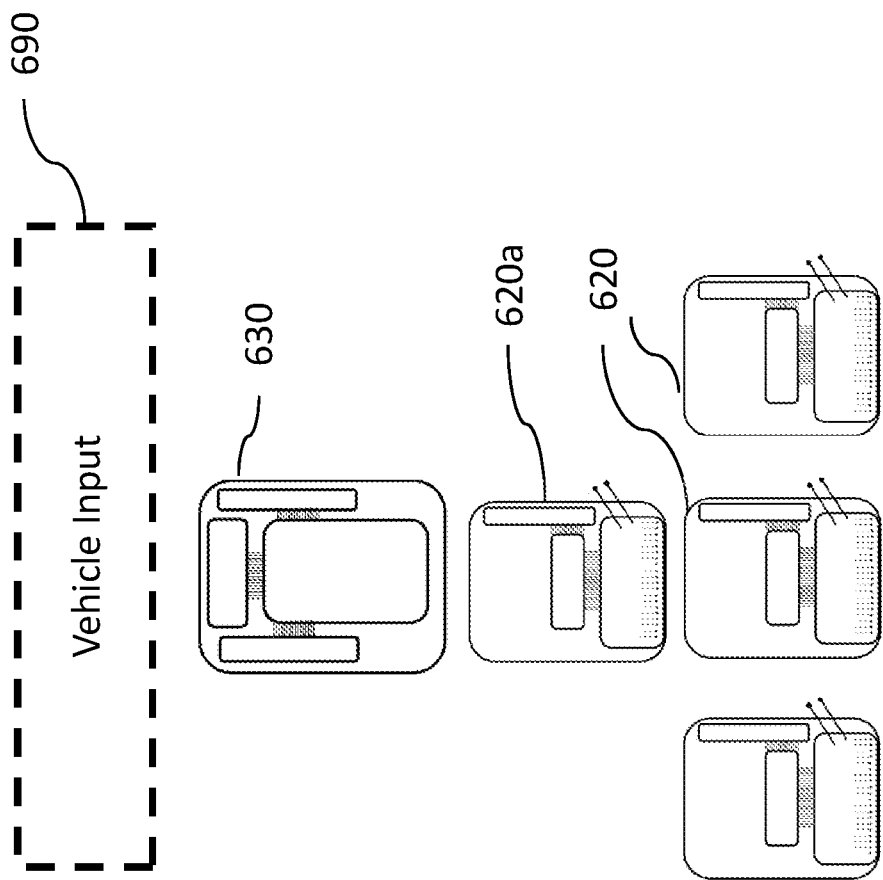
FIG. 11G shows a plurality of a leaner version of some multi-level integrated controllers electronically linked in hierarchy and controlled by integrated controller with logical module, memory and communication interfaces but without power module.

FIG. 11G shows a plurality of a leaner version of some multi-level integrated controllers 620 incorporating a power module, electronically linked to and controlled by an integrated controller 630 incorporating only a logical module, with memory and communication interfaces. Integrated controller 620a receive the electric power from integrated controllers 620 that are lower in hierarchy. Such arrangement may be suitable for obtaining vehicle commands by the top integrated controller 630, which distributes corresponding switching commands to the plurality of integrated controllers 620, or for obtaining data indicative of the vehicle's current power needs that is processed by the logical module to generate switching commands to the power module, which distributes these switching commands to the power modules of the plurality of integrated controllers 620. In this example the vehicle input 690 may either specification vehicle's energetic needs or specific command for battery switching arrangement.

In some embodiment of the present invention a battery pack comprises 24 standard 18650 Li-ion cells. This design may provide voltage ranging from 3.6V to 86V with 52 Ah to 2.2 Ah, as illustrated in Table 1 below.

TABLE 1

| Number of cells in serial | Number of alternative combinations | V | Ah |
|---|---|---|---|
| 1 | 1 | 3.6 | 52.8 |
| 2 | 3 | 7.2 | 26.4 |
| 3 | 2 | 10.8 | 17.6 |
| 4 | 4 | 14.4 | 13.2 |
| 6 | 3 | 21.6 | 8.8 |
| 8 | 3 | 28.8 | 6.6 |
| 12 | 3 | 43.2 | 4.4 |
| 16 | 1 | 57.6 | 3.3 |
| 18 | 1 | 64.8 | 2.9 |
| 24 | 1 | 86.4 | 2.2 |

In some embodiment of the present invention a battery pack comprises 144 standard 18650 Li-ion cells: 6 cells in each of level one circuit, 6 branches in each of level two circuit and 4 branches in level three circuit. In this example the controller is operable to cause the battery module to configure the switches such that the battery pack may provide voltage ranging from 3.6V to 518V with 316 Ah to 2.2 Ah, in 36 combinations, as illustrated in table 2.

| Number of cells in serial | number of alternative combinations | V | Max Ah |
|---|---|---|---|
| 1 | 1 | 3.6 | 316.8 |
| 2 | 3 | 7.2 | 158.4 |
| 3 | 3 | 10.8 | 105.6 |
| 4 | 6 | 14.4 | 79.2 |
| 5 | 2 | 18.0 | 52.6 |
| 6 | 8 | 21.6 | 52.8 |
| 8 | 7 | 28.8 | 39.6 |
| 9 | 3 | 32.4 | 35.2 |
| 10 | 4 | 36.0 | 31.7 |
| 12 | 13 | 43.2 | 26.4 |
| 15 | 4 | 54.0 | 17.5 |
| 16 | 6 | 57.6 | 19.8 |
| 18 | 7 | 64.8 | 17.6 |
| 20 | 6 | 72.0 | 13.1 |
| 24 | 12 | 86.4 | 13.2 |
| 25 | 1 | 90.0 | 8.5 |
| 27 | 1 | 97.2 | 8.8 |
| 30 | 6 | 108.0 | 8.8 |
| 32 | 3 | 115.2 | 9.9 |
| 36 | 8 | 129.6 | 8.8 |
| 40 | 4 | 144.0 | 6.6 |
| 45 | 2 | 162.0 | 4.4 |
| 48 | 7 | 172.8 | 6.6 |
| 50 | 1 | 180.0 | 5.3 |
| 54 | 2 | 194.4 | 4.4 |
| 60 | 6 | 216.0 | 4.4 |
| 64 | 1 | 230.4 | 2.8 |
| 72 | 5 | 259.2 | 4.4 |
| 75 | 1 | 270.0 | 2.4 |
| 80 | 2 | 288.0 | 3.3 |
| 90 | 2 | 324.0 | 2.2 |
| 96 | 2 | 345.6 | 2.2 |
| 100 | 1 | 360.0 | 2.2 |
| 108 | 1 | 388.8 | 2.2 |
| 120 | 2 | 432.0 | 2.2 |
| 144 | 1 | 518.4 | 2.2 |

According to some embodiments, the battery pack may be charged in parallel while monitoring the state of charge (SOC), of each cell. Once a cell reaches full charge, it may be disconnected. In this way each cell of the battery pack may be charged according to its resistance, capacity, and SOC, avoiding overcharging or too slow charging, for safety reasons.

According to some embodiments of the invention, when one or a plurality of cells show poor performance (e.g., below a certain performance threshold), a preventive measure may be applied to avoid the battery pack from wearing out too soon. The cell is used in certain percentage of the time, or only during acceleration after full stop of the vehicle. In this way the degradation process of cells may be slowed down, extending lifespan of cells and maintaining a useful battery pack.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stored on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A multi-level power cell pack switching circuitry comprising:
   a plurality of first level cell circuits for connecting a plurality of power cells, the plurality of first level cell circuits comprising: 1) a first cell circuit, 2) a second cell circuit, 3) a third cell circuit, and 4) a fourth cell circuit, wherein the first cell circuit comprises:
- a first cell having a positive terminal and a negative terminal;
- a second cell having a positive terminal and a negative terminal;
- a first switch for connecting the positive terminal of the first cell to a first node of the first cell circuit;
- a second switch for connecting the positive terminal of the second cell to the first node of the first cell circuit;
- a third switch for connecting the negative terminal of the first cell to a second node of the first cell circuit;
- a fourth switch for connecting the negative terminal of the second cell to the second node of the first cell circuit; and
- a fifth switch for connecting the positive terminal of the first cell to the negative terminal of the second cell, the second cell circuit comprises:
- a third cell having a positive terminal and a negative terminal;
- a fourth cell having a positive terminal and a negative terminal;
- a sixth switch for connecting the positive terminal of the third cell to a first node of the second cell circuit;
- a seventh switch for connecting the positive terminal of the fourth cell to the first node of the second cell circuit;
- an eighth switch for connecting the negative terminal of the third cell to a second node of the second cell circuit;
- a ninth switch for connecting the negative terminal of the second cell to the second node of the second cell circuit; and
- a tenth switch for connecting the positive terminal of the third cell to the negative terminal of the fourth cell, the third cell circuit comprises:
- a fifth cell having a positive terminal and a negative terminal;
- a sixth cell having a positive terminal and a negative terminal;
- an eleventh switch for connecting the positive terminal of the fifth cell to a first node of the third cell circuit;
- a twelfth switch for connecting the positive terminal of the sixth cell to the first node of the third cell circuit;
- a thirteenth switch for connecting the negative terminal of the fifth cell to a second node of the third cell circuit;
- a fourteenth switch for connecting the negative terminal of the sixth cell to the second node of the third cell circuit; and
- a fifteenth switch for connecting the positive terminal of the fifth cell to the negative terminal of the sixth cell, the fourth cell circuit comprises:
- a seventh cell having a positive terminal and a negative terminal;
- an eighth cell having a positive terminal and a negative terminal;
- a sixteenth switch for connecting the positive terminal of the seventh cell to a first node of the fourth cell circuit;
- a seventeenth switch for connecting the positive terminal of the eighth cell to the first node of the fourth cell circuit;
- an eighteenth switch for connecting the negative terminal of the seventh cell to a second node of the fourth cell circuit;
- a nineteenth switch for connecting the negative terminal of the eighth cell to the second node of the fourth cell circuit; and
- a twentieth switch for connecting the positive terminal of the seventh cell to the negative terminal of the eighth cell;
- a twenty-first switch for connecting the first node of the first cell circuit to a third node;
- a twenty-second switch for connecting the second node of the first cell circuit to a fourth node;
- a twenty-third switch for connecting the first node of the second cell circuit to the third node;
- a twenty-fourth switch for connecting the second node of the second cell circuit to the fourth node;
- a twenty-fifth switch for connecting the first node of the first cell circuit to the second node of the second cell circuit;
- a twenty-sixth switch for connecting the first node of the third cell circuit to a fifth node;
- a twenty-seventh switch for connecting the second node of the third cell circuit to a sixth node;
- a twenty-eighth switch for connecting the first node of the fourth cell circuit to the fifth node;
- a twenty-ninth switch for connecting the second node of the fourth cell circuit to the sixth node;
- a thirtieth switch for connecting the first node of the third cell circuit to the second node of the fourth cell circuit; and
- a thirty-first switch for connecting the third node to the sixth node.

2. The switching circuitry of claim 1, embodied in an electronic chip.

3. The switching circuitry of claim 1, further comprising sensors for sensing one or a plurality of performance parameters of the power cells.

4. The switching circuitry of claim 3, wherein the performance parameters are selected from a group consisting of: current, voltage, temperature, pressure, humidity, impedance, SOC, SOH and recorded history.

5. The switching circuitry of claim 1, further comprising a controller configured to operate the switches, so as to allow connecting power cells of said plurality of power cells or a plurality of cell circuits of said plurality of cell circuits of consecutively progressing levels, or a first combination thereof, in parallel, in series or in a second combination thereof, and to change any of the first or second combinations, and so as to allow connecting or disconnecting one or a plurality of the power cells, or one or a plurality of the cell circuits.

6. The switching circuitry of claim 5, further comprising sensors for sensing one or a plurality of performance parameters of the power cells, and wherein the controller is configured to operate the switches according to a switching scheme based on the sensed one or a plurality of performance parameters.

7. The switching circuitry of claim 6, wherein the performance parameters are selected from a group consisting of: current, voltage, temperature, pressure, impedance, humidity, SOC, SOH and recorded history.

8. A power pack comprising:
a plurality of power cells, each of the power cells having a positive terminal and a negative terminal; and
a multi-level power cell pack switching circuitry comprising:
- a plurality of first level cell circuits for connecting the plurality of power cells, wherein, the plurality of first level cell circuits comprises: 1) a first cell circuit, 2) a second cell circuit, 3) a third cell circuit, and 4) a fourth cell circuit, wherein the first cell circuit comprises:
- a first cell having a positive terminal and a negative terminal;
- a second cell having a positive terminal and a negative terminal;
- a first switch for connecting the positive terminal of the first cell to a first node of the first cell circuit;
- a second switch for connecting the positive terminal of the second cell to the first node of the first cell circuit;
- a third switch for connecting the negative terminal of the first cell to a second node of the first cell circuit;
- a fourth switch for connecting the negative terminal of the second cell to the second node of the first cell circuit; and
- a fifth switch for connecting the positive terminal of the first cell to the negative terminal of the second cell, the second cell circuit comprises:
- a third cell having a positive terminal and a negative terminal;
- a fourth cell having a positive terminal and a negative terminal;
- a sixth switch for connecting the positive terminal of the third cell to a first node of the second cell circuit;
- a seventh switch for connecting the positive terminal of the fourth cell to the first node of the second cell circuit;
- an eighth switch for connecting the negative terminal of the third cell to a second node of the second cell circuit;
- a ninth switch for connecting the negative terminal of the fourth cell to the second node of the second cell circuit; and
- a tenth switch for connecting the positive terminal of the third cell to the negative terminal of the fourth cell, the third cell circuit comprises:
- a fifth cell having a positive terminal and a negative terminal;
- a sixth cell having a positive terminal and a negative terminal;
- an eleventh switch for connecting the positive terminal of the fifth cell to a first node of the third cell circuit;
- a twelfth switch for connecting the positive terminal of the sixth cell to the first node of the third cell circuit;
- a thirteenth switch for connecting the negative terminal of the fifth cell to a second node of the third cell circuit;
- a fourteenth switch for connecting the negative terminal of the sixth cell to the second node of the third cell circuit; and
- a fifteenth switch for connecting the positive terminal of the fifth cell to the negative terminal of the sixth cell, the fourth cell circuit comprises:
- a seventh cell having a positive terminal and a negative terminal;
- an eighth cell having a positive terminal and a negative terminal;
- a sixteenth switch for connecting the positive terminal of the seventh cell to a first node of the fourth cell circuit;
- a seventeenth switch for connecting the positive terminal of the eighth cell to the first node of the fourth cell circuit;
- an eighteenth switch for connecting the negative terminal of the seventh cell to a second node of the fourth cell circuit;
- a nineteenth switch for connecting the negative terminal of the eighth cell to the second node of the fourth cell circuit; and
- a twentieth switch for connecting the positive terminal of the seventh cell to the negative terminal of the eighth cell;

a twenty-first switch for connecting the first node of the first cell circuit to a third node;
a twenty-second switch for connecting the second node of the first cell circuit to a fourth node;
a twenty-third switch for connecting the first node of the second cell circuit to the third node;
a twenty-fourth switch for connecting the second node of the second cell circuit to the fourth node;
a twenty-fifth switch for connecting the first node of the first cell circuit to the second node of the second cell circuit;
a twenty-sixth switch for connecting the first node of the third cell circuit to a fifth node;
a twenty-seventh switch for connecting the second node of the third cell circuit to a sixth node;
a twenty-eighth switch for connecting the first node of the fourth cell circuit to the fifth node;
a twenty-ninth switch for connecting the second node of the fourth cell circuit to the sixth node;
a thirtieth switch for connecting the first node of the third cell circuit to the second node of the fourth cell circuit; and
a thirty-first switch for connecting the third node to the sixth node.

9. The power pack of claim 8, wherein the switching circuitry is embodied in an electronic chip.

10. The power pack of claim 8, further comprising sensors for sensing one or a plurality of performance parameters of the power cells.

11. The power pack of claim 10, wherein the performance parameters are selected from a group consisting of: current, voltage, temperature, pressure, impedance, SOC, SOH and saved history.

12. The power pack of claim 8, further comprising a controller configured to operate the switches, so as to allow connecting power cells of said plurality of power cells or a plurality of cell circuits of said plurality of cell circuits of consecutively progressing levels, or a first combination thereof, in parallel, in series or in a second combination thereof, and to change any of the first or second combinations, and so as to allow connecting or disconnecting one or a plurality of the power cells, or one or a plurality of the cell circuits.

13. The power pack of claim 12, further comprising sensors for sensing one or a plurality of performance parameters of the power cells, and wherein the controller is configured to operate the switches according to a switching scheme based on the sensed one or a plurality of performance parameters.

14. The power pack of claim 13, wherein the performance parameters are selected from a group consisting of: current, voltage, temperature, pressure, impedance, SOC, SOH and saved history.

15. The power pack of claim 8, wherein the power cells are selected from the group consisting of: battery cells, fuel cells, capacitors and photovoltaic cells.

* * * * *